United States Patent
Ovadia

(10) Patent No.: US 7,634,582 B2
(45) Date of Patent: Dec. 15, 2009

(54) METHOD AND ARCHITECTURE FOR OPTICAL NETWORKING BETWEEN SERVER AND STORAGE AREA NETWORKS

(75) Inventor: Shlomo Ovadia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1468 days.

(21) Appl. No.: 10/742,562

(22) Filed: Dec. 19, 2003

(65) Prior Publication Data

US 2005/0175341 A1 Aug. 11, 2005

(51) Int. Cl.
*G06F 15/16* (2006.01)
(52) U.S. Cl. .................. 709/249; 711/118; 711/163
(58) Field of Classification Search ............... 709/249, 709/250; 398/37
See application file for complete search history.

(56) References Cited

U.S. PATENT DOCUMENTS

| | | | |
|---|---|---|---|
| 7,181,140 B2 | 2/2007 | Ovadia | |
| 7,266,295 B2 | 9/2007 | Ovadia et al. | |
| 7,272,310 B2 | 9/2007 | Maciocco et al. | |
| 7,277,634 B2 | 10/2007 | Ovadia | |
| 7,298,973 B2 | 11/2007 | Ovadia et al. | |
| 7,310,480 B2 | 12/2007 | Maciocco et al. | |
| 7,428,383 B2 | 9/2008 | Maciocco et al. | |
| 7,483,631 B2 | 1/2009 | Ovadia et al. | |
| 2001/0025377 A1* | 9/2001 | Hinderks | 725/109 |
| 2002/0044316 A1* | 4/2002 | Myers | 359/115 |
| 2002/0133629 A1 | 9/2002 | Jones et al. | |
| 2002/0141350 A1* | 10/2002 | Qiao et al. | 370/252 |
| 2003/0012204 A1* | 1/2003 | Czeiger et al. | 370/401 |

(Continued)

FOREIGN PATENT DOCUMENTS

WO WO 01/44891 A2 6/2001

(Continued)

OTHER PUBLICATIONS http://cse.seas.wustl.edu/Research/FileDownload.asp?165 "Design of wavelength Converting Switched for Optical Burst Switching" Jeyashankher Ramamirtham Aug. 7, 2001.*

(Continued)

Primary Examiner—Ario Etienne
Assistant Examiner—Randy Scott
(74) Attorney, Agent, or Firm—Blakely, Sokoloff, Taylor & Zafman LLP

(57) ABSTRACT

A method and system for routing high-speed data to and from SANs (Storage Area Networks and Server Area Networks) via optical burst-switched (OBS) networks. OBS network components, including edge nodes and switching nodes, are coupled between SAN islands. In one embodiment, the OBS network comprises a photonic burst-switched (PBS) network. Under one scheme, a PBS edge node and SAN gateway are co-located at the interface to the SAN, while a plurality of PBS switching nodes are deployed between the PBS edge nodes. Under another scheme, PBS switching/edge nodes are co-located at respective SANs. This scheme employs an external gateway protocol (EGP) for routing data via selected route segments. Data going to and received from a SAN is packaged as Fiber Channel Frames. Data transmitted via the PBS network is converted into PBS frames having encapsulated Fiber Channel Frames. The schemes also support interfaces with legacy networks, such as LANs and WANs.

15 Claims, 20 Drawing Sheets

U.S. PATENT DOCUMENTS

| | | | |
|---|---|---|---|
| 2003/0012298 A1* | 1/2003 | Eudes et al. | 375/298 |
| 2003/0072051 A1* | 4/2003 | Myers et al. | 359/115 |
| 2003/0118053 A1 | 6/2003 | Edsall et al. | |
| 2003/0198471 A1 | 10/2003 | Ovadia | |
| 2004/0009088 A1 | 1/2004 | Glatzle et al. | |
| 2004/0015638 A1* | 1/2004 | Forbes | 710/316 |
| 2004/0019686 A1* | 1/2004 | Toyoda et al. | 709/229 |
| 2004/0042404 A1* | 3/2004 | Ravindran et al. | 370/238 |
| 2004/0120261 A1 | 6/2004 | Ovadia et al. | |
| 2004/0170165 A1 | 9/2004 | Maciocco et al. | |
| 2004/0170431 A1 | 9/2004 | Maciocco et al. | |
| 2004/0184426 A1* | 9/2004 | Tan | 370/338 |
| 2004/0208171 A1 | 10/2004 | Ovadia et al. | |
| 2004/0208561 A1* | 10/2004 | Kinoshita et al. | 398/59 |
| 2004/0234263 A1 | 11/2004 | Ovadia et al. | |
| 2005/0030951 A1 | 2/2005 | Maciocco et al. | |

FOREIGN PATENT DOCUMENTS

WO PCT/US2004/040386      4/2005

OTHER PUBLICATIONS http://www.hoti.org/archive/Hoti11_program/papers/hoti11_15_choy_m.pdf "Design of Optical Burst Switches based on Dual Shuffle-exchange Network and Deflection Routing"—Yun Deng.*

Khattar, Ravi Kumar et al., "Introduction to Storage Area Network, SAN", International Technical Support Organization, Aug. 1999, 152 pages, IBM.

Meggyesi, Zoltan, "Fibre Channel Overview", KFKI-RMKI, Research Institute for Particle and Nuclear Physics, Dec. 9, 1997; 12 pages.

"PICMG 3.2 Advanced Telecommunications and Computing Architecture, InfiniBand Technology Delivers Performance, Scalability, and Fault Tolerance for Next Generation Platforms", White Paper, Rev 1.30, 9 pages, Mellanox Technologies, Inc., (pre-filing date).

"Interconnecting Fibre Channel SANs Over Optical and IP Infrastructures", White Paper, 2001, 13 pages, San Valley Systems.

Rajaduray, R., "Impact of Burst Assembly Parameters on Edge Router Latency in an Optical Burst Switching Network," *IEEE*, 2003, pp. 55-56.

Oh, Se-Yoon et al., "A Data Burst Assembly Algorithm in Optical Burst Switching Networks," ETRI Journal, vol. 24, No. 4, Aug. 2002, pp. 311-322.

Chaskar, Hemant M. et al., "Robust Transport of IP Traffic over WDM using Optical Burst Switching," Optical Networks Magazine, Jul./Aug. 2002, pp. 47-60.

Cao, Xiaojun et al., "Assembling TCP/IP Packets in Optical Burst Switched Networks," *IEEE*, 2002, pp. 2808-2812.

Rajagopalan, Bala et al., "IP over Optical Networks: Architectural Aspects," *IEEE*, Sep. 2000, pp. 94-102.

Jeong, Myoungki et al., "On a New Multicasting Approach in Optical Burst Switched Networks," *IEEE*, Nov. 2002, pp. 96-103.

* cited by examiner

METHOD AND ARCHITECTURE FOR OPTICAL NETWORKING BETWEEN SERVER AND STORAGE AREA NETWORKS

CROSS REFERENCE TO RELATED APPLICATIONS

The present application is related to U.S. patent application Ser. No. 10/126,091, filed Apr. 17, 2002; U.S. patent application Ser. No. 10/183,111, filed Jun. 25, 2002; U.S. patent application Ser. No. 10/328,571, filed Dec. 24, 2002; U.S. patent application Ser. No. 10/377,312 filed Feb. 28, 2003; U.S. patent application Ser. No. 10/377,580 filed Feb. 28, 2003; U.S. patent application Ser. No. 10/417,823 filed Apr. 16, 2003; U.S. patent application Ser. No. 10/417,487 filed Apr. 17, 2003; U.S. patent application Ser. No. 10/441,771 filed May 19, 2003, U.S. patent application Ser. No. 10/464,969 filed Jun. 18, 2003, U.S. patent application Ser. No. 10/606,323 filed Jun. 14, 2003, and U.S. patent application Ser. No. 10/636,062 filed Aug. 6, 2003.

FIELD OF THE INVENTION

The field of invention relates generally to storage and/or server area networks (SANs) and, more specifically, to techniques for transmission of data between SANs using optical-switched networks.

BACKGROUND INFORMATION

The amount of data generated and collected by businesses has seen exponential growth in recent years, with such growth expected to continue into the future. Data is the underlying resource on which business computing processes are based. To ensure that business processes deliver the expected results, they must have access to the data. Management and protection of business data is vital for the availability of business processes. Management covers aspects such as configuration, performance, and protection, which ranges from what to do if media fails, to complete disaster recovery procedures.

In a mainframe environment, the management of storage is centralized. Storage devices are connected to the mainframe host, and managed directly by the IT department where a system programmer (storage administrator) is completely dedicated to this task. It is relatively straightforward and easy to manage storage in this manner.

The advent of client/server computing created a new set of problems, such as escalating management costs for the desktop, as well as new storage management problems. The information that was centralized in a mainframe environment is now dispersed across one or more networks and is often poorly managed and controlled. Storage devices are dispersed and connected to individual machines; capacity increases must be planned machine by machine; storage acquired for one operating system platform often cannot be used on other platforms.

The computing industry has recognized for decades the split between presentation, processing, and data storage. Client/server architecture is based on this three-tiered model. The top tier uses the desktop for data presentation. The desktop is usually based on Personal Computers (PC). The middle tier, comprising application servers, does the processing. Application servers such as e-mail or web servers are accessed by the desktop and use data stored on the bottom tier, which comprises storage devices containing the data.

To address the foregoing problems, technologies related to Storage Area Network and Server Area Network (both referred to herein as a "SAN") networking and storage solutions have been and are being developed. A SAN is a high-speed network that allows the establishment of direct connections between storage devices and processors (servers) within the distance supported by the networks connection infrastructure, which most commonly comprises Fibre Channel (FC) infrastructure. In today's SAN environments, the storage devices in the bottom tier are centralized and interconnected, which represents, in effect, a move back to the central storage model of the host or mainframe.

The SAN can be viewed as an extension to the storage bus concept, which enables storage devices and servers to be interconnected using similar elements as in local area networks (LANs) and wide area networks (WANs): routers, hubs, switches, directors, and gateways. A SAN can be shared between servers and/or dedicated to one server. It can support both homogeneous (i.e., common platform) and heterogeneous (mixed platform) architectures.

An example of a pair of heterogeneous SAN architectures 100A and 100B is shown in FIG. 1. Each architecture is configured in accordance with the conventional three-tier architecture discussed above, including a client tier, an application server tier, and a storage tier. The client tiers include various types of client computers 102, such as workstations, personal computers, laptops, etc. Client computers in a client tier are connected to servers 104 in application server tier via a LAN (local area network) or WAN (wide area network) 106 (labeled 106A and 106B for the respective architectures 100A and 100B). In turn, the servers 104 in a server tier are connected to storage devices 108 in the storage tier via respective SANs 110A and 110B.

A heterogeneous architecture supports various server hardware and platform types, and is independent of platform vendor and operating system type. Storage devices 108 in the storage tier 106 are used to store data that may be accessed via SANs 110A and 110B. In general, most any type of mass storage device may be deployed in a SAN storage tier if that device is compatible with the SAN infrastructure.

The consolidation of business entities into larger enterprises has led to a common occurrence where individual SANs, representing islands of storage, are isolated from one another. In order to facilitate continuous communication between different SANs, an efficient transport mechanism must be employed. Under one conventional scheme, the transport mechanism is done using Ethernet interfaces and switches with an IP (Internet Protocol) such as shown in FIG. 1. In order to interface between SAN 110A and SAN 110B, SAN gateways 112A and 112B are used between IP network 114. The SAN gateways facilitate reconfiguration of data according to specific protocols to facilitate the exchange of data across the gateway.

While SANs are generally considered highly efficient networks, the traffic sent over a SAN is much different than the traffic for which IP networks were designed to handle. IP networks are predicated on routing, and typically serve large numbers of customers and may include hundreds or even thousands of routers, switches, bridges, etc. Under the IP protocol, data is sent by encapsulating the data into relatively small packets that include headers that are examined at each routing hop along the route between a data source and data destination, such as between SANS 110A and 110B of FIG. 1. This encompasses a large amount of overhead. In contrast, SAN traffic typically comprises larger payloads sent across very short routes, often point-to-point. Thus, SANs are designed for handling bulk traffic, with routing considerations being secondary. When sending data between SANs using an IP network, these large payloads must be broken into many packets of much smaller size at a source SAN gateway, sent across the IP network individually, often along different routes, and reassembled at a destination SAN gateway. As a result, data transmissions via SANs using conventional transport mechanisms such as IP networks is very inefficient and consumes valuable bandwidth and network resources.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Figure 1:
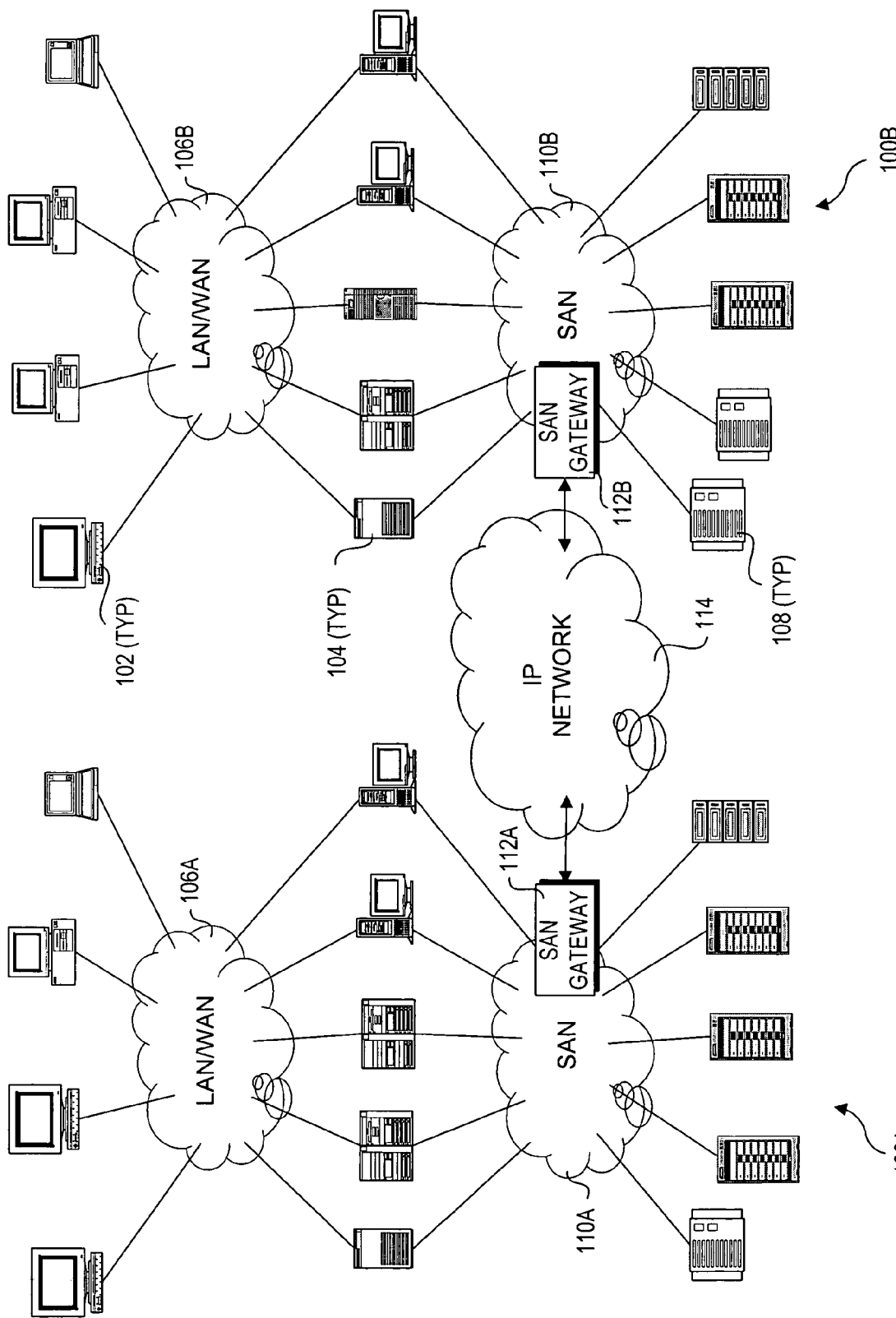
FIG. 1 is a schematic diagram illustrating components of a typical Storage Area Network (SAN) and a conventional technique for sending traffic between SAN islands using an IP network.

Embodiments of techniques for enabling transmission of data between SANs using optical switched networks are described herein. In the following description, numerous specific details are set forth, such as descriptions of embodiments that are implemented for photonic burst-switched (PBS) networks, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments described herein, inter-network communication between two or more disparate SANs, and optional other legacy network types, including LANs and WANs, is facilitated by optical-switched networks. In the following detailed descriptions, embodiments of the invention are disclosed with reference to their use in photonic burst-switched (PBS) networks. A PBS network is a type of optical-switched network, typically comprising a high-speed hop and span-constrained network, such as an enterprise network. The term "photonic burst" is used herein to refer to statistically-multiplexed packets (e.g., Internet protocol (IP) packets, Ethernet frames, Fibre Channel (FC) frames) having similar routing requirements. Although conceptually similar to backbone-based optical burst-switched (OBS) networks, the design, operating constraints, and performance requirements of these high-speed hop and span-constrained networks may be different. However, it will be understood that the teaching and principles disclosed herein may be applicable to other types of optical switched networks as well.

Conventional optical switched networks typically use wavelength routing techniques, which require that optical-electrical-optical (O-E-O) conversion of optical signals be done at the optical switching node. O-E-O conversion at each switching node in the optical network is not only a very slow operation (typically about ten milliseconds), but it is a very costly, power-consuming operation that potentially creates a traffic bottleneck for the optical switched network. In addition, the current optical switch technologies cannot efficiently support "bursty" traffic that is often experienced in packet communication applications (e.g., the Internet).

Figure 2:
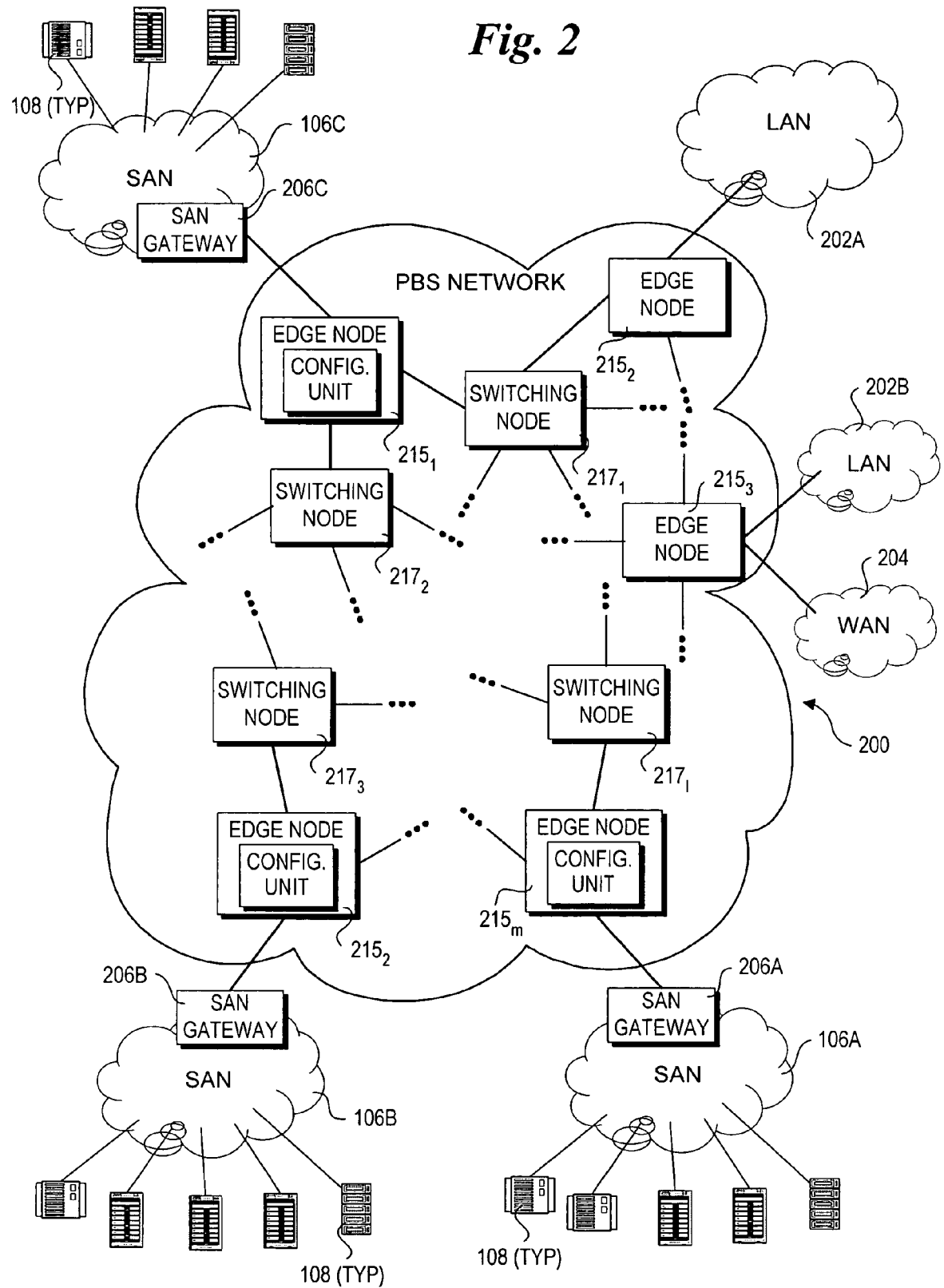
FIG. 2 is a simplified block diagram illustrating a photonic burst-switched (PBS) network with variable time slot provisioning, which is connected to multiple SANs and LAN networks, according to one embodiment of the present invention.

An exemplary architecture under which a PBS network 200 is employed to facilitate inter-network communication between SANs 106A, 106B, and 106C, LANs 202A and 202B, and a WAN 204 is shown in FIG. 2. PBS network 200 includes a plurality of nodes, including edge nodes $215_1$-$215_M$ and switching nodes $217_1$-$217_L$. PBS network 200 may further include additional edge and switching nodes (not shown) that are interconnected with the switching nodes shown in FIG. 2. In the illustrated embodiment, an edge node functions as both an ingress and egress node. In an optional configuration, the ingress and egress nodes may comprise separate nodes. Accordingly, ingress and egress node functionality is described separately below; it will be understood that reference to ingress or egress nodes may be applicable to an edge nodes as well. The edge nodes, in effect, provide an interface between "external" networks (i.e., external to the PBS network; SANs 106A-C, LAN 202A and 202B, and WAN 204 in the embodiment of FIG. 2) and the switching nodes of the PBS network. In this embodiment, the ingress, egress and switching nodes functions are implemented with intelligent modules.

In some embodiments, an ingress node performs optical-electrical (O-E) conversion of received optical signals, and includes electronic memory to buffer the received signals until they are sent to the appropriate external network. In addition, in some embodiments, the ingress nodes also perform electrical-optical (E-O) conversion of the received electrical signals before they are transmitted to switching nodes $217_1$-$217_M$ of PBS network 200.

Egress nodes are implemented with optical switching units or modules that are configured to receive optical signals from other nodes of PBS network 200 and route them to external networks. Egress nodes can also receive optical signals from an external network and send them to appropriate destination nodes within PBS network 200, thus functioning as an ingress node. In one embodiment, an egress node performs O-E-O conversion of received optical signals, and includes electronic memory to buffer received signals until they are sent to the appropriate node of PBS network 200. Ingress and egress nodes may also receive a signal from and send signals out one network links implemented in the electrical domain (e.g., wired Ethernet links or the like).

Switching nodes $217_1$-$217_L$ are implemented with optical switching units or modules that are each configured to receive optical signals from other switching nodes and appropriately route the received optical signals to other switching and edge nodes of PBS network 200. As is described below, the switching nodes perform O-E-O conversion of optical control bursts and network management control burst signals. In some embodiments, these optical control bursts and network management control bursts are propagated only on preselected wavelengths. The preselected wavelengths do not propagate optical "data" bursts (as opposed to control bursts and network management control bursts) signals in such embodiments, even though the control bursts and network management control bursts may include necessary information for a particular group of optical data burst signals. The control and data information is transmitted on separate wavelengths in some embodiments (also referred to herein as out-of-band (OOB) signaling). In other embodiments, control and data information may be sent on the same wavelengths (also referred to herein as in-band (IB) signaling). In another embodiment, optical control bursts, network management control bursts, and optical data burst signals may be propagated on the same wavelength(s) using different encoding schemes such as different modulation formats, etc.

Although switching nodes $217_1$-$217_L$ may perform O-E-O conversion of the optical control signals, in this embodiment, the switching nodes do not perform O-E-O conversion of the optical data burst signals. Rather, switching nodes $217_1$-$217_L$ perform purely optical switching of the optical data burst signals. Thus, the switching nodes can include electronic circuitry to store and process the incoming optical control bursts and network management control bursts that were converted to an electronic form and use this information to configure photonic burst switch settings, and to properly route the optical data burst signals corresponding to the optical control bursts. The new control bursts, which replace the previous control bursts based on the new routing information, are converted to an optical control signal, and it is transmitted to the next switching or egress nodes.

Elements for exemplary PBS network 200 are interconnected as follows. SANs 106A, 106B, and 106C, LANs 202A and B, and WAN 204 are connected to corresponding ones of PBS edge nodes $215_1$-$215_M$. In the illustrated embodiment, a respective SAN gateway 206A, 206B, and 206C is used to facilitate the communication interface for SANs 106A, 106B, and 106C. As described below in further detail, in one embodiment the "connection" between a SAN gateway and a PBS edge node actually takes place within the same "unit," thus co-locating the functionality of a SAN gateway and a PBS edge node. In another embodiment, an optical or electrical cable-based link may be used to connect a SAN gateway to a PBS edge node.

Within PBS network 200, edge nodes $215_1$-$215_M$ are connected to some of switching nodes $217_1$-$217_L$ via optical fibers. Switching nodes $217_1$-$217_L$ are also interconnected to each other via optical fibers to form a mesh architecture including multiple lightpaths or optical links between the edge nodes. Ideally, there are multiple lightpaths to connect the switching nodes $217_1$-$217_L$ to each of the endpoints of PBS network 200 (i.e., the edge nodes are endpoints within PBS network 200). Multiple lightpaths between the switching nodes and edge nodes enable protection switching when one or more node fails, or can enable features such as primary and secondary route to destination.

As described below in conjunction with FIG. 3, the edge and switching nodes of PBS network 200 are configured to send and/or receive optical control bursts, optical data burst, and other control signals that are wavelength multiplexed so as to propagate the optical control bursts and control labels on pre-selected wavelength(s) and optical data burst or payloads on different preselected wavelength(s). Still further, the edge nodes of PBS network 200 can send optical control burst signals while sending data out of PBS network 200 (either optical or electrical).

Figure 3:
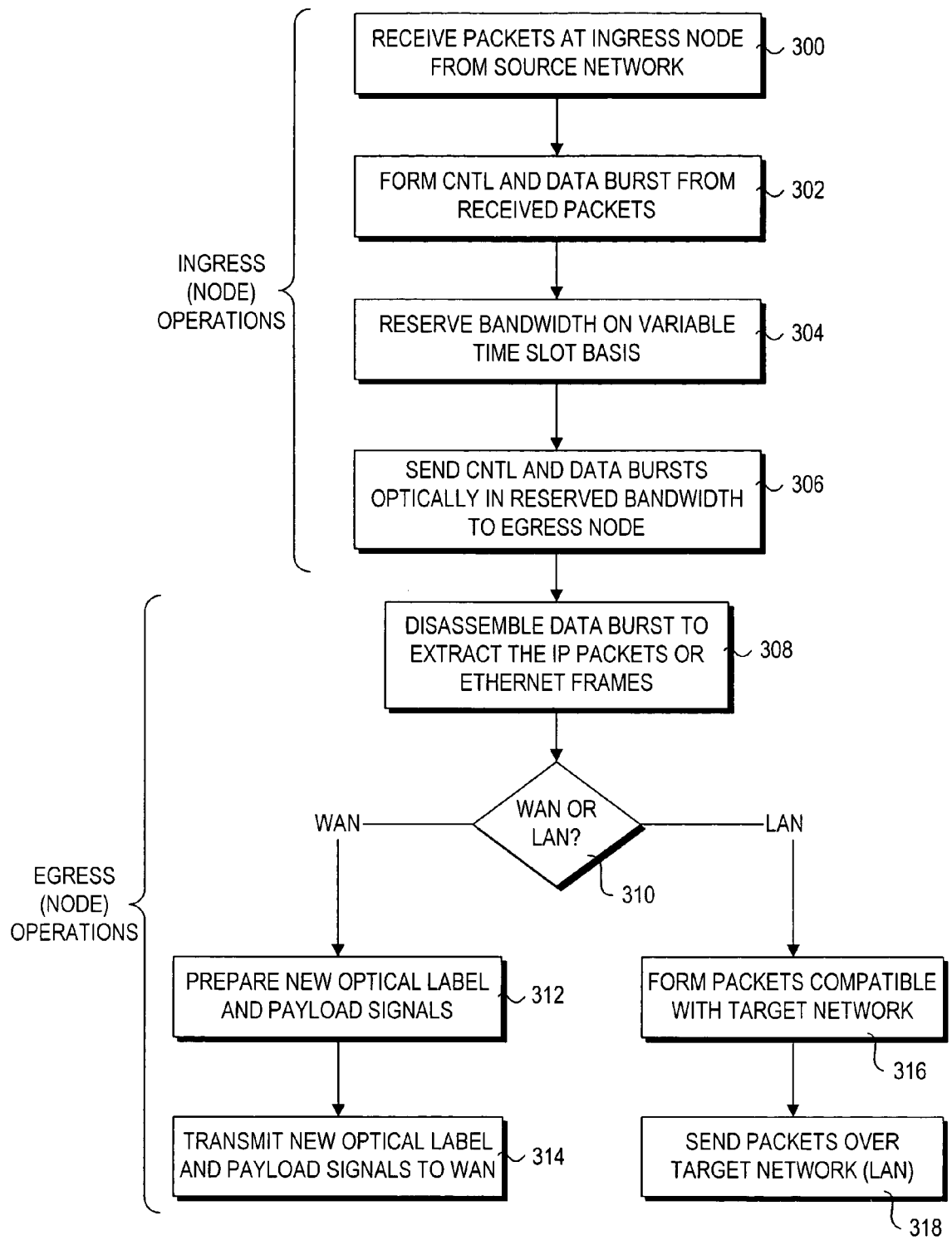
FIG. 3 is a simplified flow diagram illustrating the operation of a photonic burst-switched (PBS) network, according to one embodiment of the present invention.

FIG. 3 illustrates the operational flow of PBS network 200 when transmitting data between LANs and WANs, according to one embodiment of the present invention. This flowchart reflects the general transmission operations performed by a PBS network. In particular, the interior switching is identical for transmission of data between a SAN and one of a LAN, WAN, or another SAN. Additional provisions for SAN interfacing are described below.

Referring to FIGS. 2 and 3, the process begins in a block 300, wherein PBS network 200 receives IP packets or Ethernet frames or the like from an external network. In one embodiment, PBS network 200 receives IP packet at one of edge nodes $215_1$-$215_M$. The received packets can be in electronic form rather than in optical form, or received in optical form and then converted to electronic form. In this embodiment, the edge nodes store the received packets electronically.

For clarity, the rest of the description of the operational flow of PBS network 200 focuses on the transport of information from edge node $215_2$ (functioning as an ingress node) to edge node $215_3$ (functioning as an egress node). The transport of information between other edge nodes is substantially similar.

An optical burst label (i.e., an optical control burst) and optical payload (i.e., an optical data burst) is formed from the received IP packets, as depicted by a block 302. In one embodiment, edge node $215_1$ uses statistical multiplexing techniques to form the optical data burst from the received IP packets stored in edge node $215_2$. For example, packets received by edge node $215_2$ and having to pass through edge node $215_3$ on their paths to a destination can be assembled into an optical data burst payload.

Next, in a block 304, bandwidth on a specific optical channel and/or fiber is reserved to transport the optical data burst through PBS network 200. In one embodiment, edge node $215_2$ reserves a time slot (i.e., a time slot of a time-division multiplexed (TDM) system) in an optical data signal path through PBS network 200. This time slot may be a fixed-time duration and/or a variable-time duration with either uniform or non-uniform timing gaps between adjacent time slots. Further, in one embodiment, the bandwidth is reserved for a time period sufficient to transport the optical burst from the ingress node to the egress node. For example, in some embodiments, the edge and switching nodes maintain an updated list of all used and available time slots. The time slots can be allocated and distributed over multiple wavelengths and optical fibers. Such reserved time slots are also referred to herein as TDM channels.

When an edge node reserves bandwidth or when bandwidth is released after an optical data burst is transported, a network controller (not shown) updates the list. In one embodiment, the network controller and the edge nodes perform this updating process using various burst or packet scheduling algorithms based on the available network resources and traffic patterns. The available variable-duration TDM channels, which are periodically broadcasted to all the edge and switching nodes, are transmitted on the same wavelength as the optical control bursts or on a different common preselected wavelength throughout the optical network. The network controller function can reside in one of the edge nodes, or can be distributed across two or more edge nodes.

The optical control bursts, network management control labels, and optical data bursts are then transported through photonic burst switching network 200 in the reserved time slot or TDM channel, as depicted by a block 306. In one embodiment, edge node $215_2$ transmits the control burst to the next node along the optical label-switched path (OLSP) determined by the network controller. In this embodiment, the network controller uses a constraint-based routing protocol (e.g., multi-protocol label switching (MPLS)) over one or more wavelengths to determine the best available OLSP to the egress node.

In one embodiment, the control label (also referred to herein as a control burst) is transmitted asynchronously ahead of the photonic data burst and on a different wavelength and/or different fiber. The time offset between the control burst and the data burst allows each of the switching nodes to process the control burst and configure the photonic burst switches to appropriately switch before the arrival of the corresponding data burst. The term photonic burst switch is used herein to refer to fast optical switches that do not use O-E-O conversion.

In one embodiment, edge node $215_2$ then asynchronously transmits the optical data bursts to the switching nodes along the route (e.g., switching node $217_1$) where the optical data bursts experience little or no time delay and no O-E-O conversion within each of the switching nodes. The optical control burst is sent before the corresponding optical data burst is transmitted.

In some embodiments, the switching node may perform O-E-O conversion of the control bursts so that the node can extract and process the routing information contained in the label. Further, in some embodiments, the TDM channel is propagated in the same wavelengths that are used for propagating labels. Alternatively, the labels and payloads can be modulated on the same wavelength in the same optical fiber using different modulation formats. For example, optical labels can be transmitted using non-return-to-zero (NRZ) modulation format, while optical payloads are transmitted using return-to-zero (RZ) modulation format on the same wavelength. The optical burst is transmitted from one switching node to another switching node in a similar manner until the optical control and data bursts are terminated at edge node $215_3$.

The remaining set of operations pertains to egress node operations (e.g., egress operations performed at edge node $215_3$). Upon receiving the data burst, the egress node disassembles it to extract the encapsulated data (e.g., IP packets, Ethernet frames, Fibre Channel (FC) frames, etc.) in a block 308. In one embodiment, the egress node converts the optical data burst to electronic signals that the egress node can process to recover the data segment of each of the packets. The operational flow at this point depends on whether the target network is an optical WAN or a LAN, as depicted by a decision block 310.

If the target network is an optical WAN, new optical control and data bursts signals are formed in a block 312. In this embodiment, edge node $215_3$ prepares the new optical label and payload signals. The new control and data bursts are then transmitted to the target network (i.e., a WAN in this case) in a block 314. In this embodiment, the egress node includes an optical interface to transmit the control and data bursts to the optical WAN.

However, if in block 310 the target network is determined to be a LAN, the logic proceeds to a block 316. Accordingly, the extracted data packets or frames are processed, combined with the corresponding IP labels, and then routed to the target network (i.e., a LAN in this case). In this embodiment, edge node $215_3$ forms these new IP packets. The new IP packets are then transmitted to the target LAN, as shown in block 318.

Figure 4:
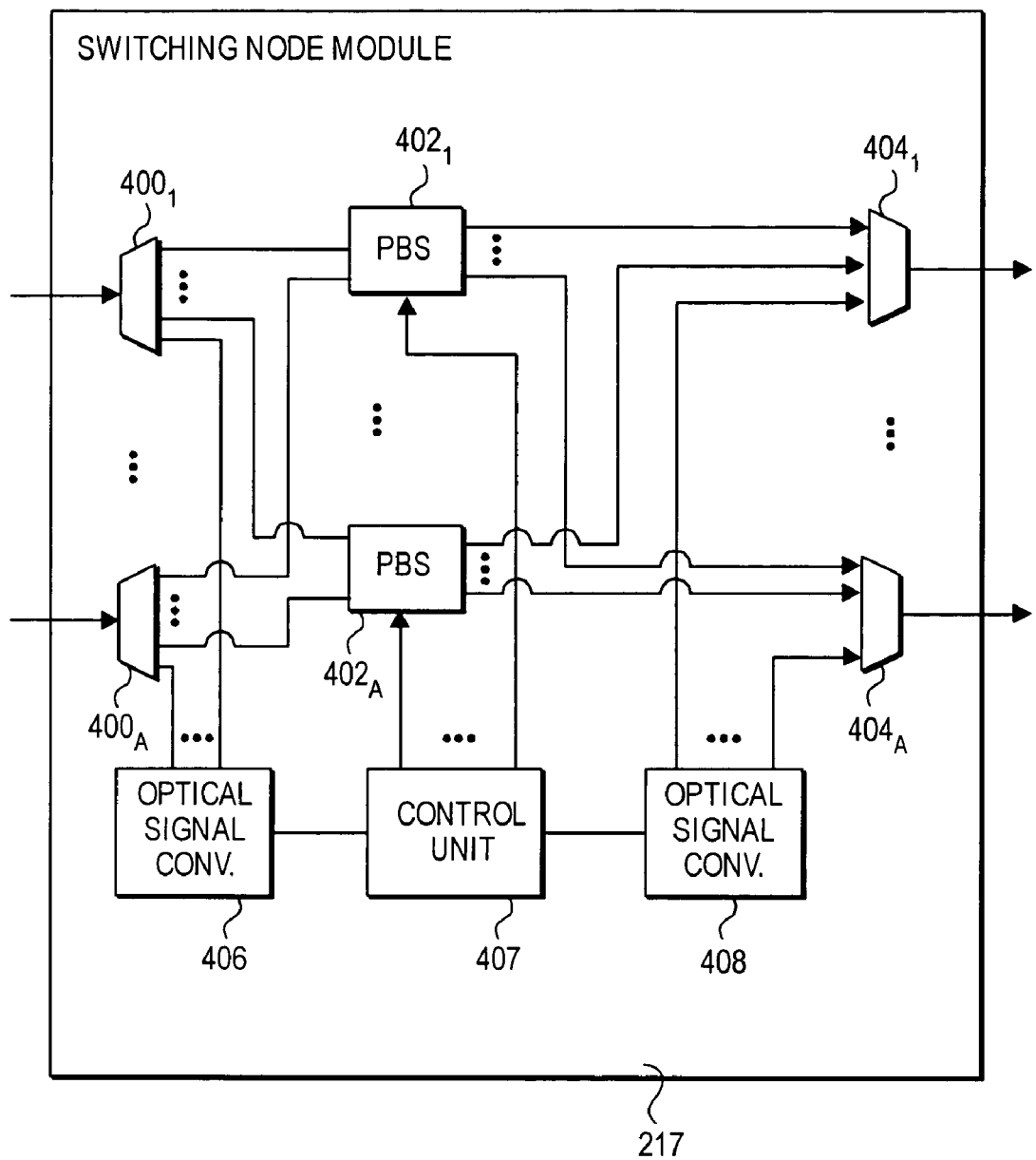
FIG. 4 is a block diagram illustrating a switching node module for use in a photonic burst-switched (PBS) network, according to one embodiment of the present invention.

FIG. 4 illustrates a module 217 for use as a switching node in PBS network 200, according to one embodiment of the present invention. Module 217 includes a set of optical wavelength division demultiplexers $400_1$-$400_A$, where A represents the number of input optical fibers used for propagating payloads, labels, and other network resources to the module. For example, in this embodiment, each input fiber could carry a set of C wavelengths (i.e., WDM wavelengths), although in other embodiments the input optical fibers may carry differing numbers of wavelengths. Module 217 would also include a set of N×N photonic burst switches $402_1$-$402_B$, where N is the number of input/output ports of each photonic burst switch. Thus, in this embodiment, the maximum number of wavelengths at each photonic burst switch is A·C, where N≧A·C+1. For embodiments in which N is greater than A·C, the extra input/output ports can be used to loop back an optical signal for buffering.

Further, although photonic burst switches $402_1$-$402_B$ are shown as separate units, they can be implemented as N×N photonic burst switches using any suitable switch architecture. Module 217 also includes a set of optical wavelength division multiplexers $404_1$-$404_A$, a set of optical-to-electrical signal converters 406 (e.g., photo-detectors), a control unit 407, and a set of electrical-to-optical signal converters 408 (e.g., lasers). Control unit 407 may have one or more processors to execute software or firmware programs.

The elements of this embodiment of module 217 are interconnected as follows. Optical demultiplexers $400_1$-$400_A$ are connected to a set of A input optical fibers that propagate input optical signals from other switching nodes of photonic burst switching network 200. The output leads of the optical demultiplexers are connected to the set of B core optical switches $402_1$-$402_B$ and to optical signal converter 406. For example, optical demultiplexer $400_1$ has B output leads connected to input leads of the photonic burst switches $402_1$-$402_B$ (i.e., one output lead of optical demultiplexer $400_1$ to one input lead of each photonic burst switch) and at least one output lead connected to optical signal converter 406.

The output leads of photonic burst switches $402_1$-$402_B$ are connected to optical multiplexers $404_1$-$404_A$. For example, photonic burst switch $402_1$ has A output leads connected to input leads of optical multiplexers $404_1$-$404_A$ (i.e., one output lead of photonic burst switch $402_1$ to one input lead of each optical multiplexer). Each optical multiplexer also an input lead connected to an output lead of electrical-to-optical signal converter 408. Control unit 407 has an input lead or port connected to the output lead or port of optical-to-electrical signal converter 406. The output leads of control unit 407 are connected to the control leads of photonic burst switches $402_1$-$402_B$ and electrical-to-optical signal converter 408. As described below in conjunction with the flow diagram of FIG. 5, module 217 is used to receive and transmit optical control bursts, optical data bursts, and network management control bursts.

Figure 5:
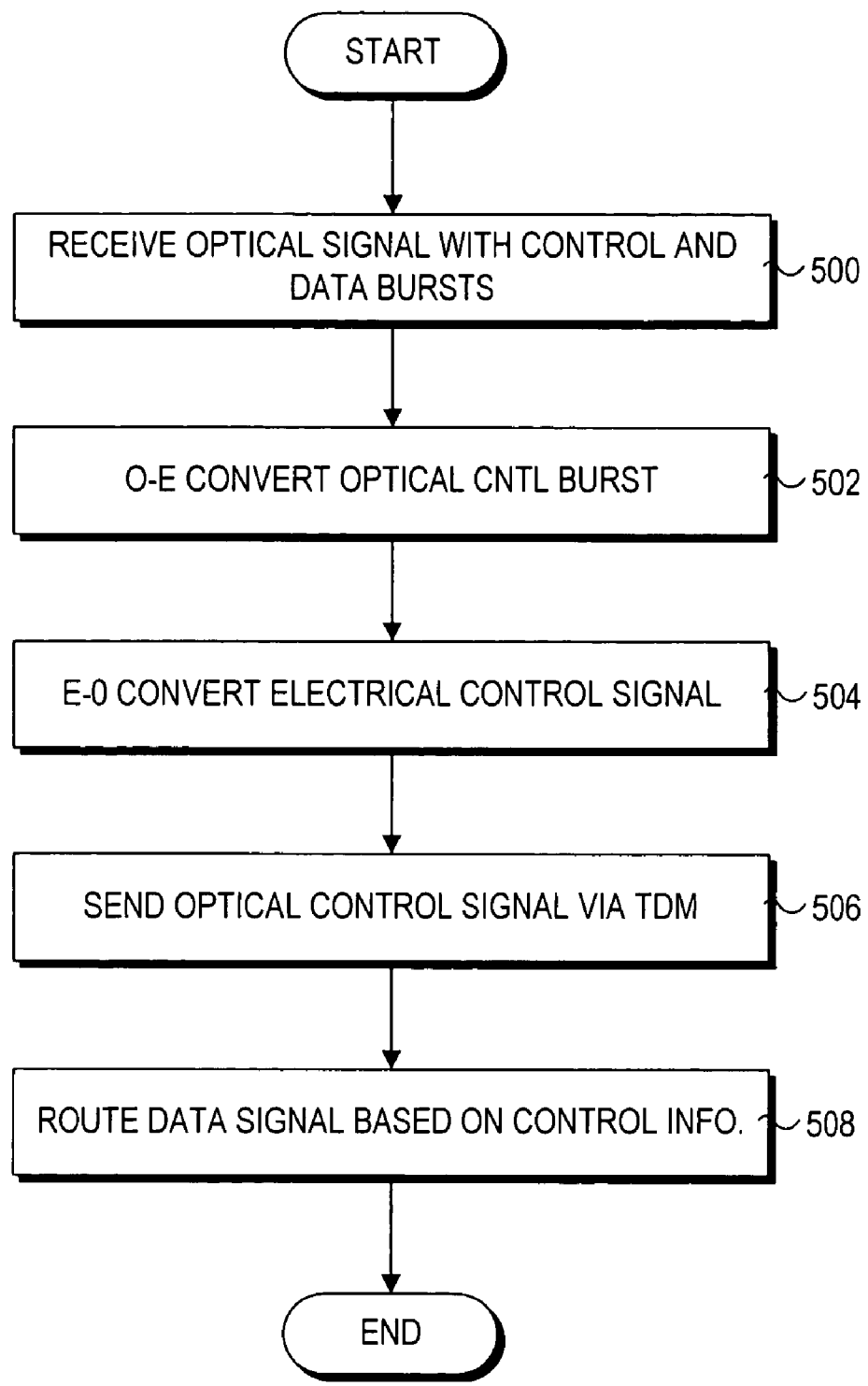
FIG. 5 is a flow diagram illustrating the operation of a switching node module, according to one embodiment of the present invention.
Figure 7:
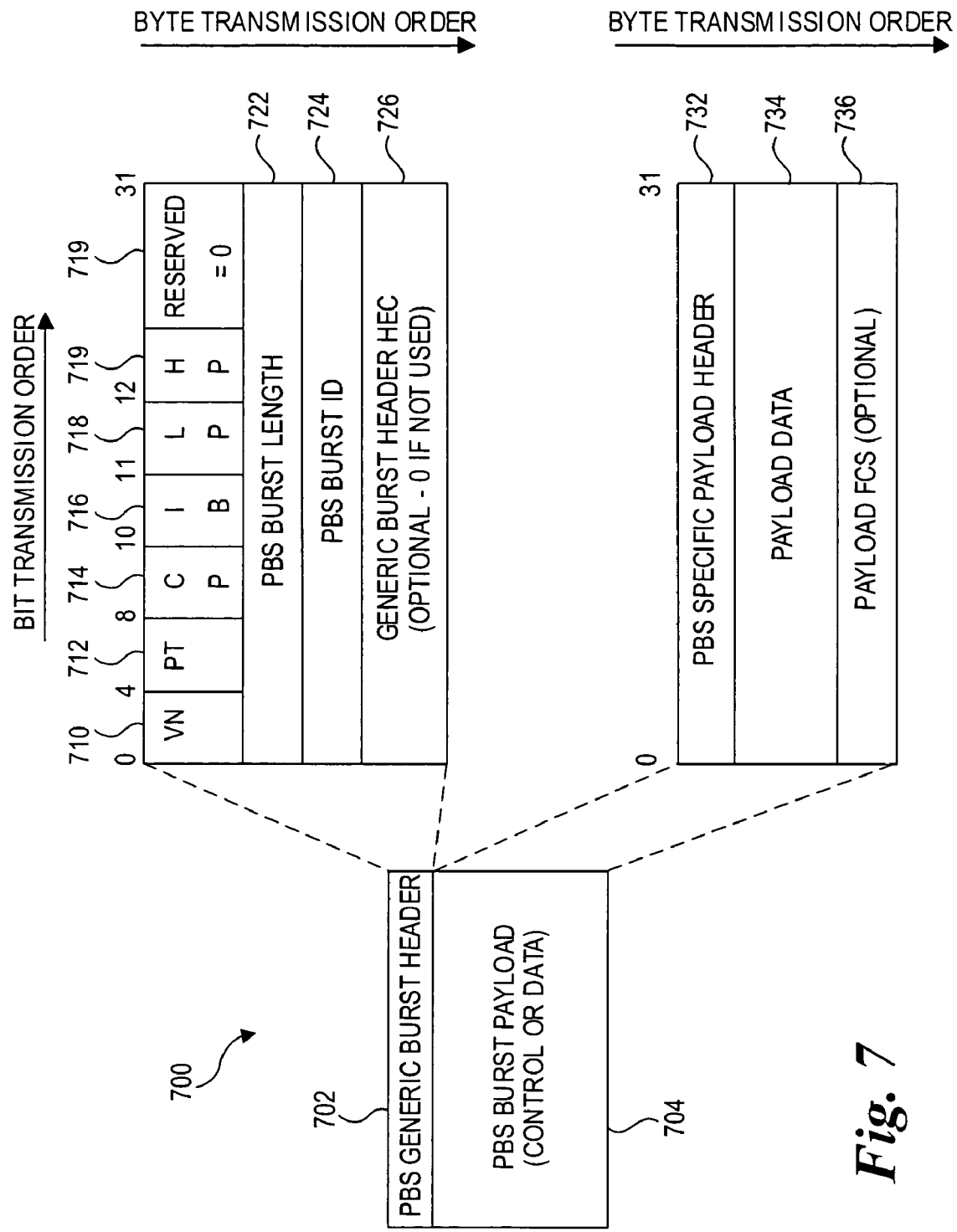
FIG. 7 is a diagram illustrating generic PBS framing format for PBS optical bursts, according to one embodiment of the present invention.

FIG. 7 illustrates the operational flow of module 217, according to one embodiment of the present invention. Referring to FIGS. 4 and 5, module 217 operates as follows.

Module 217 receives an optical signal with TDM control and data burst signals. In this embodiment, module 217 receives an optical control signal (e.g., an optical control burst) and an optical data signal (i.e., an optical data burst in this embodiment) at one or two of the optical demultiplexers. For example, the optical control signal may be modulated on a first wavelength of an optical signal received by optical demultiplexer $400_A$, while the optical data signal is modulated on a second wavelength of the optical signal received by optical demultiplexer $400_A$. In some embodiments, the optical control signal may be received by a first optical demultiplexer while the optical data signal is received by a second optical demultiplexer. Further, in some cases, only an optical control signal (e.g., a network management control burst) is received. A block 500 represents this operation.

Module 217 converts the optical control signal into an electrical signal. In this embodiment, the optical control signal is the optical control burst signal, which is separated from the received optical data signal by the optical demultiplexer and sent to optical-to-electrical signal converter 406. In other embodiments, the optical control signal can be a network management control burst. Optical-to-electrical signal converter 406 converts the optical control signal into an electrical signal. For example, in one embodiment each portion of the TDM control signal is converted to an electrical signal. The electrical control signals received by control unit 407 are processed to form a new control signal. In this embodiment, control unit 407 stores and processes the information contained in the control signals. A block 502 represents this operation.

Module 217 then converts the processed electrical control signal to a new optical control burst. In this embodiment, control unit 407 provides TDM channel alignment so that reconverted or new optical control bursts are generated in the desired wavelength and TDM time slot pattern. The new control burst may be modulated on a wavelength and/or time slot different from the wavelength and/or time slot of the control burst received in block 500. A block 504 represents this operation.

Module 217 then sends the optical control burst to the next switching node in the route. In this embodiment, electrical-to-optical signal generator 408 sends the new optical control burst to appropriate optical multiplexer of optical multiplexers $404_1$-$404_A$ to achieve the route. A block 506 represents this operation.

Module 217 then routes the optical data signals (i.e., optical data burst in this embodiment) to one of optical multiplexers $404_1$-$404_A$, based on routing information contained in the control signal. In this embodiment, control unit 407 processes the control burst to extract the routing and timing information and sends appropriate PBS configuration signals to the set of B photonic burst switches $402_1$-$402_B$ to re-configure each of the photonic burst switches to switch the corresponding optical data bursts. A block 508 represents this operation.

Figure 6:
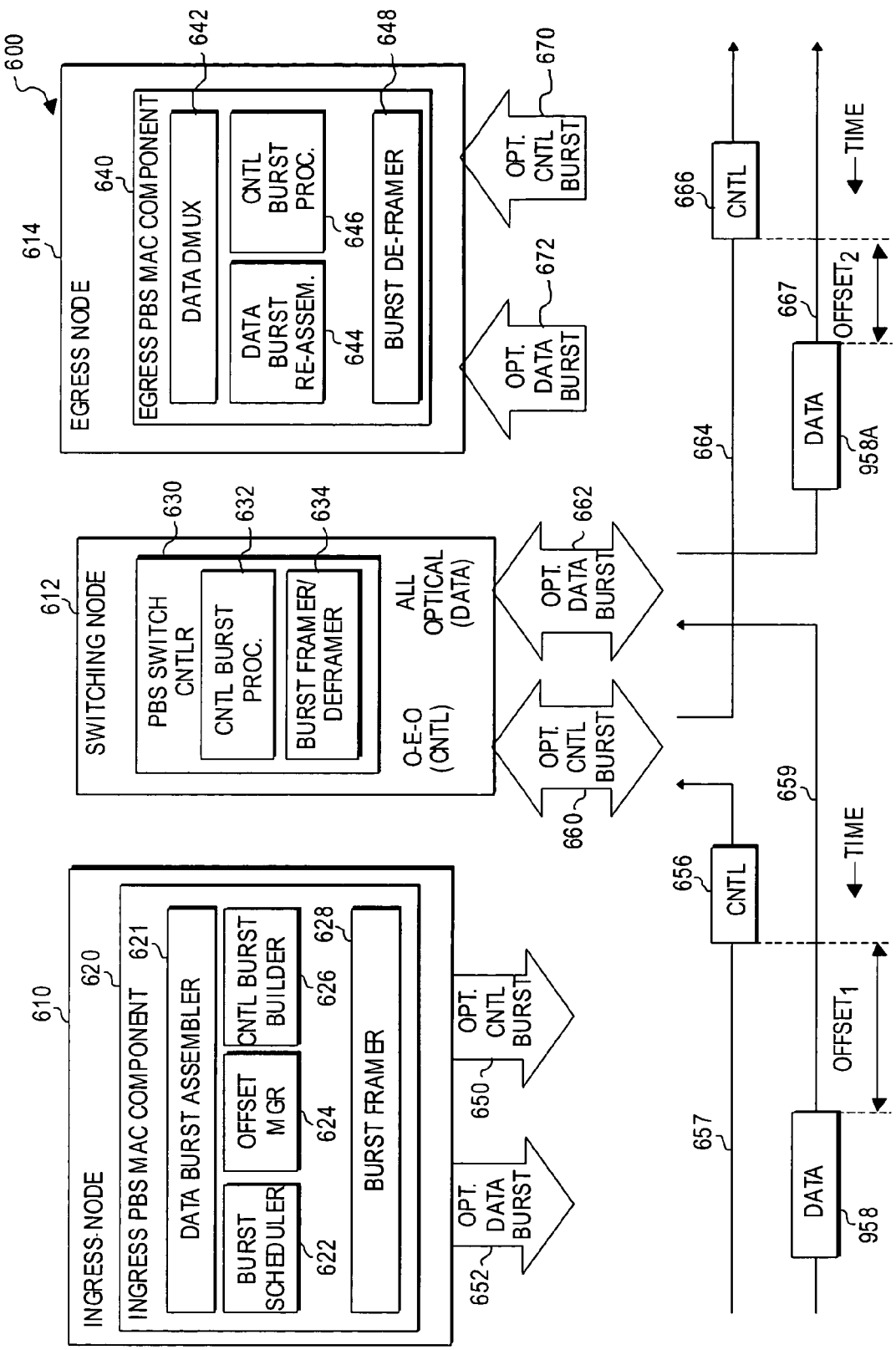
FIG. 6 is a diagram illustrating PBS optical burst flow between nodes in a PBS network, according to one embodiment of the present invention.

FIG. 6 illustrates PBS optical burst flow between nodes under an exemplary PBS architecture 600, according to one embodiment of the present invention. Architecture 600 includes an ingress node 610, a switching node 612, an egress node 614 and other nodes (egress, switching, and ingress that are not shown to avoid obscuring the description of the optical burst flow). In this embodiment, the illustrated components of ingress, switching and egress nodes 610, 612 and 614 are implemented using machine-readable instructions that cause a machine (e.g., a processor) to perform operations that allow the nodes to transfer information to and from other nodes in the PBS network. In this example, the lightpath for the optical burst flow is from ingress node 610, to switching node 612 and then to egress node 614.

Ingress node 610 includes an ingress PBS MAC (Media Access Channel) layer component 620 having a data burst assembler 621, a data burst scheduler 622, an offset time manager 624, a control burst builder 626 and a burst framer 628. In one embodiment, data burst assembler 621 assembles the data bursts to be optically transmitted over PBS network 200. In one embodiment, the size of the data burst is determined based on many different network parameters such as quality-of-service (QoS), number of available optical channels, the size of electronic buffering at the ingress nodes, the specific burst assembly algorithm, etc.

Data burst scheduler 622, schedules the data burst transmission over PBS network 200. Ingress PBS MAC layer component 610 generates a bandwidth request for insertion into the control burst associated with the data burst being formed. In one embodiment, data burst scheduler 622 also generates the schedule to include an offset time (from offset manager 624 described below) to allow for the various nodes in PBS network 200 to process the control burst before the associated data burst arrives.

In one embodiment, offset time manager 624 determines the offset time based on various network parameters such as, for example, the number of hops along the selected lightpath, the processing delay at each switching node, traffic loads for specific lightpaths, and class of service requirements. Then control burst builder 626 builds the control burst using information such as the required bandwidth, burst scheduling time, in-band or out-of-band signaling, burst destination address, data burst length, data burst channel wavelength, offset time, priorities, and the like.

Figure 12:
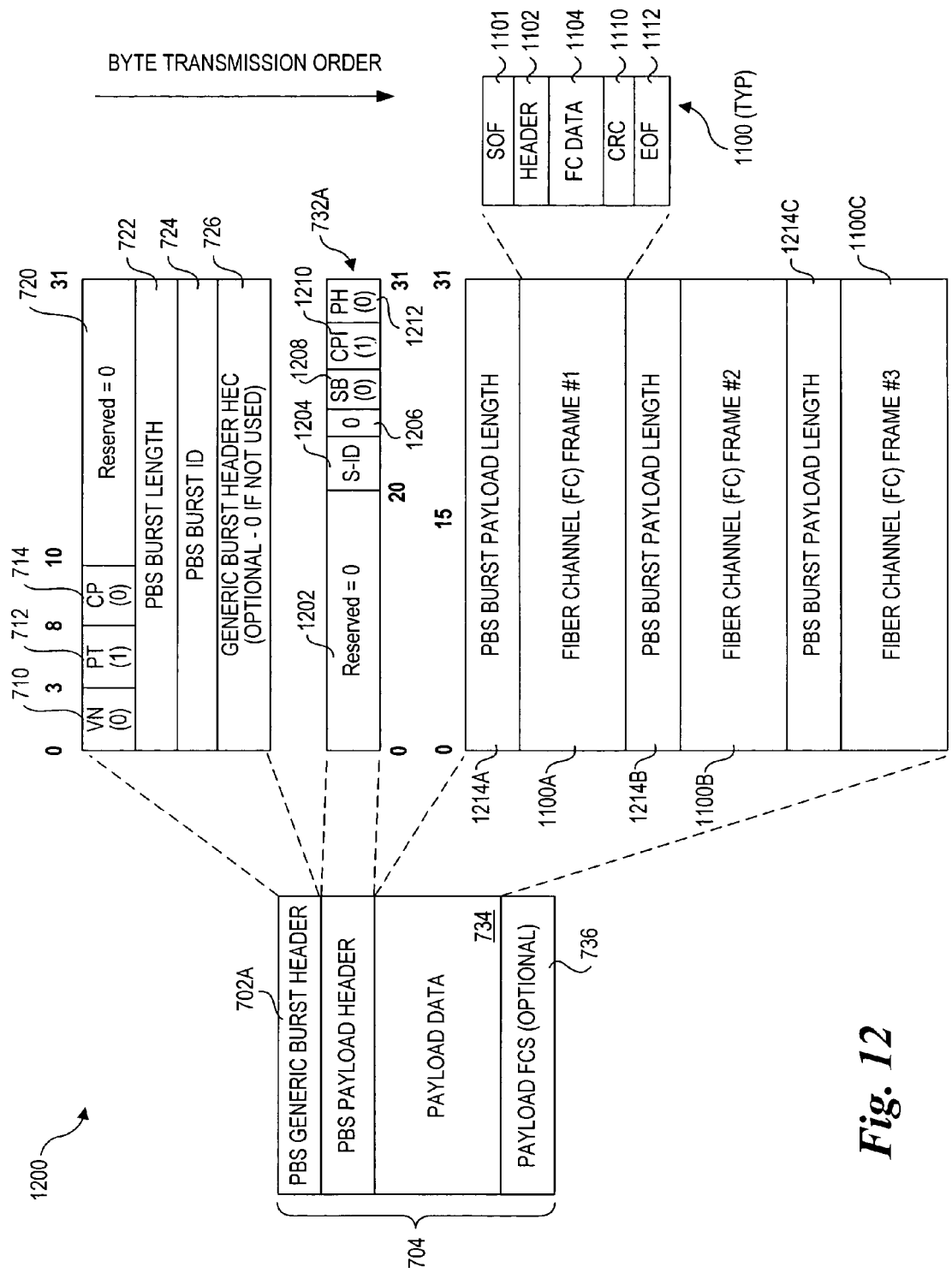
FIG. 12 is a diagram illustrating details of the PBS framing format under on or more Fibre Channel frames may be encapsulated.

Burst framer 628 frames the control and data bursts (using the framing format described below in conjunction with FIGS. 7, 8, and 12 in some embodiments). Burst framer 628 then transmits the control burst over PBS network 200 via a physical optical interface (not shown), as indicated by an arrow 650. In this embodiment, the control burst is transmitted out of band (OOB) to switching node 612, as indicated by an optical control burst 656 and PBS TDM channel 657 in FIG. 6. Burst framer 628 then transmits the data burst according to the schedule generated by burst scheduler 622 to switching node 612 over the PBS network via the physical optical interface, as indicated by an optical burst 658 and PBS TDM channel 659 in FIG. 6. The time delay between optical bursts 656 (control burst) and 658 (data burst) in indicated as an $OFFSET_1$ in FIG. 6.

Switching node 612 includes a PBS switch controller 630 that has a control burst processing component 632, a burst framer/de-framer 634 and a hardware PBS switch (not shown). Optical control burst 656 is received via a physical optical interface (not shown) and optical switch (not shown) and converted to electrical signals (i.e., O-E conversion). Control burst framer/de-framer 634 de-frames the control burst information and provides the control information to control burst processing component 632. Control burst processing component 632 processes the information, determining the corresponding data burst's destination, bandwidth reservation, next control hop, control label swapping etc.

PBS switch controller component 630 uses some of this information to control and configure the optical switch (not shown) to switch the optical data burst at the appropriate time duration to the next node (i.e., egress node 614 in this example) at the proper channel. In some embodiments, if the reserved bandwidth is not available, PBS switch controller component 630 can take appropriate action. For example, in one embodiment PBS switch controller 630 can: (a) determine a different lightpath to avoid the unavailable optical channel (e.g., deflection routing); (b) delay the data bursts using integrated buffering elements within the PBS switch fabric such as fiber delay lines; (c) use a different optical channel (e.g. by using tunable wavelength converters); and/or (d) drop only the coetaneous data bursts. Some embodiments of PBS switch controller component 630 may also send a negative acknowledgment message back to ingress node 610 to re-transmit the dropped burst.

However, if the bandwidth can be found and reserved for the data burst, PBS switch controller component 630 provides appropriate control of the hardware PBS switch (not shown). In addition, PBS switch controller component 630 generates a new control burst based on the updated reserved bandwidth from control burst processing component 632 and the available PBS network resources. Control burst framer/de-framer 634 then frames the re-built control burst, which is then optically transmitted to egress node 614 via the physical optical interface (not shown) and the optical switch (not shown), as indicated by PBS TDM channel 664 and an optical control burst 666 in FIG. 6.

Subsequently, when the optical data burst corresponding to the received/processed control burst is received by switching node 612, the hardware PBS switch is already configured to switch the optical data burst to egress node 614. In other situations, switching node 612 can switch the optical data burst to a different node (e.g., another switching node not shown in FIG. 6). The optical data burst from ingress node 610 is then switched to egress node 614, as indicated by PBS TDM channel 667 and an optical data burst 658A. In this embodiment, optical data burst 658A is simply optical data burst 658 re-routed by the hardware PBS switch (not shown), but possibly transmitted in a different TDM channel. The time delay between optical control burst 666 and optical data burst 658A is indicated by an $OFFSET_2$ in FIG. 6, which is smaller than $OFFSET_1$ due, for example, to processing delay and other timing errors in switching node 612.

Egress node 614 includes a PBS MAC component 940 that has a data demultiplexer 642, a data burst re-assembler 644, a control burst processing component 646, and a data burst de-framer 648. Egress node 614 receives the optical control burst as indicated by an arrow 670 in FIG. 6. Burst de-framer 648 receives and de-frames the control burst via a physical O-E interface (not shown). In this embodiment, control burst processing component 646 processes the de-framed control burst to extract the pertinent control/address information.

After the control burst is received, egress node 614 receives the data burst(s) corresponding to the received control burst, as indicated by an arrow 672 in FIG. 6. In this example, egress node 614 receives the optical data burst after a delay of $OFFSET_2$, relative to the end of the control burst. In a manner similar to that described above for received control bursts, burst de-framer 648 receives and de-frames the data burst. Data burst re-assembler 644 then processes the de-framed data burst to extract the data (and to re-assemble the data if the data burst was a fragmented data burst). Data de-multiplexer 642 then appropriately de-multiplexes the extracted data for transmission to the appropriate destination (which can be a network other than the PBS network).

FIG. 7 illustrates a generic PBS framing format 700 for PBS optical bursts, according to one embodiment of the present invention. Generic PBS frame 700 includes a PBS generic burst header 702 and a PBS burst payload 704 (which can be either a control burst or a data burst). FIG. 7 also includes an expanded view of PBS generic burst header 702 and PBS burst payload 704.

PBS generic burst header 702 is common for all types of PBS bursts and includes a version number (VN) field 710, a payload type (PT) field 712, a control priority (CP) field 714, an in-band signaling (IB) field 716, a label present (LP) field 718, a header error correction (HEC) present (HP) field 719, a burst length field 722, and a burst ID field 724. In some embodiments, PBS generic burst header also includes a reserved field 720 and a HEC field 726. Specific field sizes and definitions are described below for framing format having 32-bit words; however, in other embodiments, the sizes, order and definitions can be different.

In this embodiment, PBS generic burst header 702 is a 4-word header. The first header word includes VN field 710, PT field 712, CP field 714, IB field 716 and LP field 718. VN field 710 in this exemplary embodiment is a 4-bit field (e.g., bits 0-3) defining the version number of the PBS Framing format being used to frame the PBS burst. In this embodiment, VN field 710 is defined as the first 4-bits of the first word, but in other embodiments, it need not be the first 4-bits, in the first word, or limited to 4-bits.

PT field 712 is a 4-bit field (bits 4-7) that defines the payload type. Exemplary payload types are shown below.

CP field 714 is a 2-bit field (bits 8-9) that defines the burst's priority. For example, binary "00" may indicate a normal priority while binary "01" indicates a high priority.

IB field 716 is a one-bit field (bit 10) that indicates whether the PBS control burst is being signaled in-band or OOB. For example, binary "0" may indicate OOB signaling while binary "1" indicates in-band signaling. LP field 718 is a one-bit field (bit 11) used to indicate whether a label has been established for the lightpath carrying this header.

HP field 719 is a one-bit (bit 12) used to indicate whether header error correction is being used in this control burst. The unused bits (bits 13-31) form reserved field 720 that is currently unused and reserved for future use.

The second word in PBS generic burst header 702 contains PBS burst length field 722, which is used to store a binary value equal to the length the number of bytes in PBS burst payload 704. In this embodiment, the PBS burst length field is 32-bits.

The third word in PBS generic burst header 702 contains PBS burst ID field 724, which is used to store an identification number for this burst. In this embodiment, PBS burst ID field 724 is 32-bits generated by the ingress node (e.g., ingress node 610 in FIG. 6).

The fourth word in PBS generic burst header 702 contains generic burst header HEC field 726, which is used to store an error correction word. In this embodiment, generic burst header HEC field 726 is 32-bits generated using any suitable known error correction technique. As in indicated in FIG. 7, generic burst header HEC field 726 is optional in that if error correction is not used, the field may be filled with all zeros. In other embodiments, generic burst header HEC field 726 is not included in PBS generic burst header 702.

PBS burst payload 704 is common for all types of PBS bursts and includes a PBS specific payload header field 732, a payload field 734, and a payload frame check sequence (FCS) field 736.

In this exemplary embodiment, PBS specific payload header 732 is the first part (i.e., one or more words) of PBS burst payload 704. Typically, specific payload header field 732 includes one or more fields for information related to a data burst, which can be either this burst itself or contained in another burst associated with this burst (i.e., when this burst is a control burst).

Payload data field 734 is the next portion of PBS burst payload 704. In some embodiments, control bursts have no payload data, so this field may be omitted or contain all zeros. For data bursts, payload data field 734 may be relatively large (e.g., containing multiple data packets or frames).

Payload FCS field 736 is the next portion of PBS burst payload. In this embodiment, payload FCS field 736 is a one-word field (i.e., 32-bits) used in error detection and/or correction. As in indicated in FIG. 7, payload FCS field 736 is optional in that if error detection/correction is not used, the field may be filled with all zeros. In other embodiments, payload FCS field 736 is not included in PBS burst payload 704.

Figure 8:
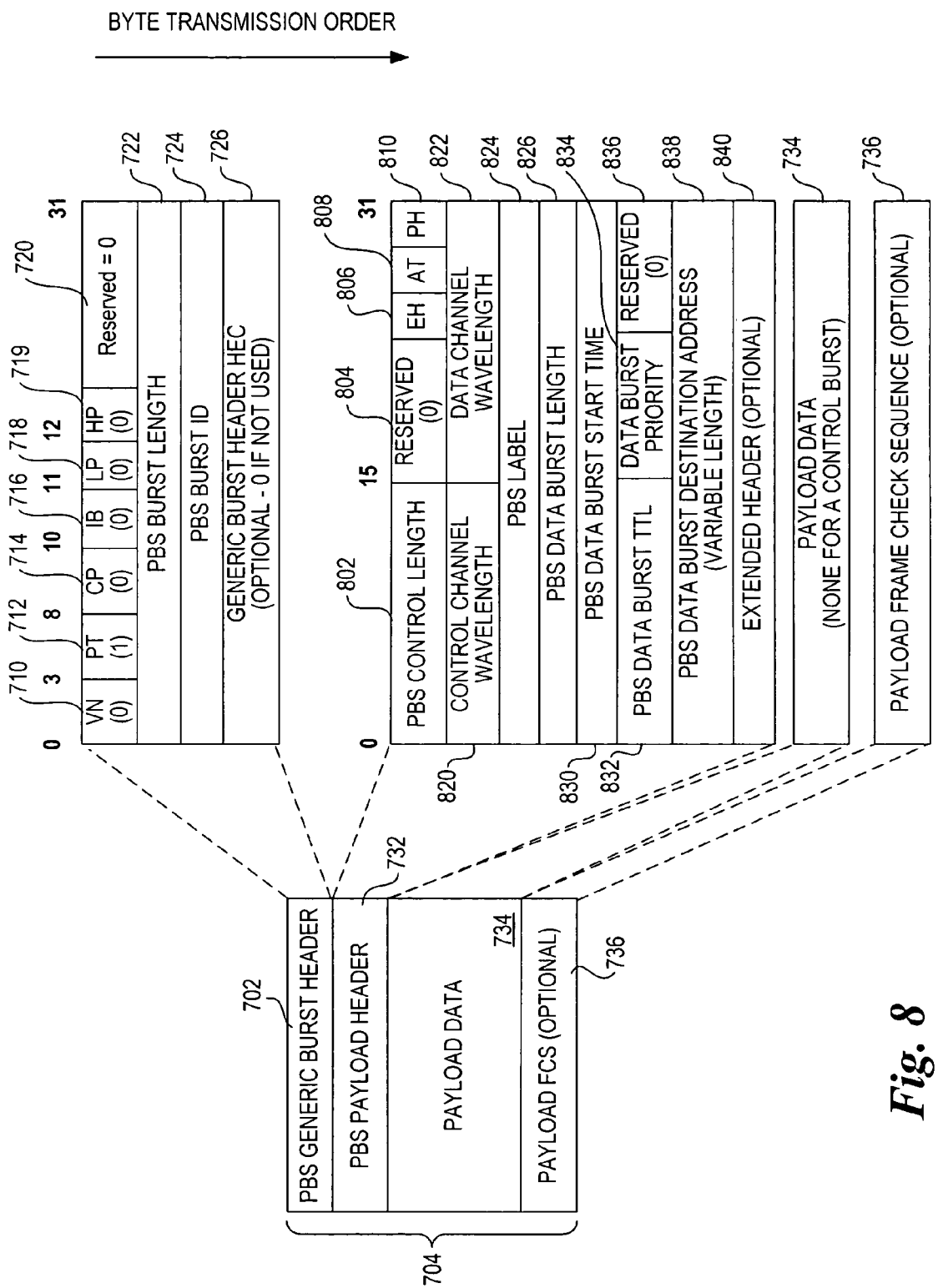
FIG. 8 is a diagram illustrating further details of the PBS framing format of FIG. 7, according to one embodiment of the present invention.

FIG. 8 illustrates a PBS optical control burst framing format 800, according to one embodiment of the present invention. To help improve clarity, FIG. 8 includes the expanded views of PBS generic burst header 702 and PBS burst payload 704 (previously described in conjunction with FIG. 7), with a further expansion of PBS payload header field 732 (described below) when part of a control burst. In this example, the PT field is set to "01" to indicate that the burst is a control burst. The CP field is set to "0" to indicate that the burst has normal priority. The IB field is set to "0" to indicate that the burst is using OOB signaling. The LP field is set to "0" to indicate that there is no label for this control burst.

In this exemplary embodiment of a PBS control burst, PBS payload header field 732 includes: a PBS control length field 802; an extended header (EH) field 806; an address type (AT) field 808; a payload FCS present (PH) field 810; a control channel wavelength field 820; a data channel wavelength field 822; a PBS label field 824; a PBS data burst length field 826; a PBS data burst start time field 830; a PBS data burst time-to-live (TTL) field 832; a data burst priority field 834; a PBS data burst destination address field 838; and an optional extended header field 840.

In this embodiment, the first word of PBS payload header 732 includes PBS control length field 802, which is used for storing the length of the control header in bytes. In this embodiment, PBS control length field 802 is a 16-bit field (bits 0-15) calculated by control burst builder 626 (FIG. 6) or control burst processor 632 (FIG. 6). In other embodiments, PBS control length field 802 need not be the first 16-bits, in the first word, or limited to 16-bits. A reserved field 804 (bits 16-27) is included in PBS payload header 732 in this embodiment. In other embodiments, these bits may be used for other field(s).

The first word of PBS payload header 732 also includes EH field 806, which is used in this embodiment to indicate whether an extended header is present in the burst. In this embodiment, EH field 806 is a 1-bit field (bit 28). In other embodiments, EH field 806 need not be bit 28, or in the first word.

The first word of PBS payload header 732 also includes AT field 808, which is used in this embodiment to indicate the address type of the associated PBS data burst's destination. For example, the address type may be an IP address (e.g., IPv4, IPv6), a network service access point (NSAP) address, an Ethernet address or other type of address. In one embodiment, AT field 808 is a 2-bit field (bits 29-30).

The first word of PBS payload header 732 also includes PH field 810, which is used to indicate whether a payload FCS is present in the burst. In this embodiment, PH field 810 is a 1-bit field (bit 31).

The second word of PBS payload header 732 includes control channel wavelength field 820, which is used to indicate a WDM wavelength in which the control burst is supposed to be modulated. In this embodiment, control channel wavelength field 820 is a 16-bit field (bits 0-15).

The second word of PBS payload header 732 also includes data channel wavelength field 822, which is used to indicate a WDM wavelength in which the data burst is to be modulated. In this embodiment, data channel wavelength field 822 is a 16-bit field (bits 16-31).

A third word of PBS payload header 732 includes PBS label field 824, which is used to store the label (if any) for the lightpath being used by the burst. In this embodiment, the label is a 32-bit word generated by a label management component.

A fourth word of PBS payload header 732 includes PBS data burst length field 826. In this embodiment, the PBS data burst length is a 32-bit word.

A fifth word of PBS payload header 732 includes PBS data burst start time field 830. In this embodiment, the PBS data burst start time is a 32-bit word, generated by burst scheduler 622 (FIG. 6).

A sixth word of PBS payload header 732 includes PBS data TTL field 832. In this embodiment, PBS data TTL field 932 is a 16-bit (bits 0-15) field, generated by ingress PBS MAC component 620 (FIG. 6). For example, in one embodiment, burst scheduler 622 (FIG. 6) of ingress PBS MAC component 620 can generate the TTL value.

The sixth word of PBS payload header 732 also includes data burst priority field 832. In this embodiment, data burst priority field 832 is an 8-bit field (bits 16-23), generated by ingress PBS MAC component 620 (FIG. 6). For example, in one embodiment, burst scheduler 622 (FIG. 6) of ingress PBS MAC component 620 can generate the data burst priority value. Further, in this embodiment, the sixth word of PBS payload header 732 includes a reserved field 836 (bits 24-31) which can be used in the future for other field(s).

A seventh word of PBS payload header 732 also includes PBS data burst destination address field 838. In this embodiment, PBS data burst destination address field 838 is variable length field, shown as a single 32-bit word for clarity. The actual length of the address may vary, depending on the address type as indicated in AT field 808.

An eight word of PBS payload header 732 can include an optional extended header field 840. This header can be used to hold other header data that may be used in the future. When this header is used, EH field 806 is set to 1. In this embodiment, payload data field 734 and payload FCS field 736 have been described above.

Figure 9A:
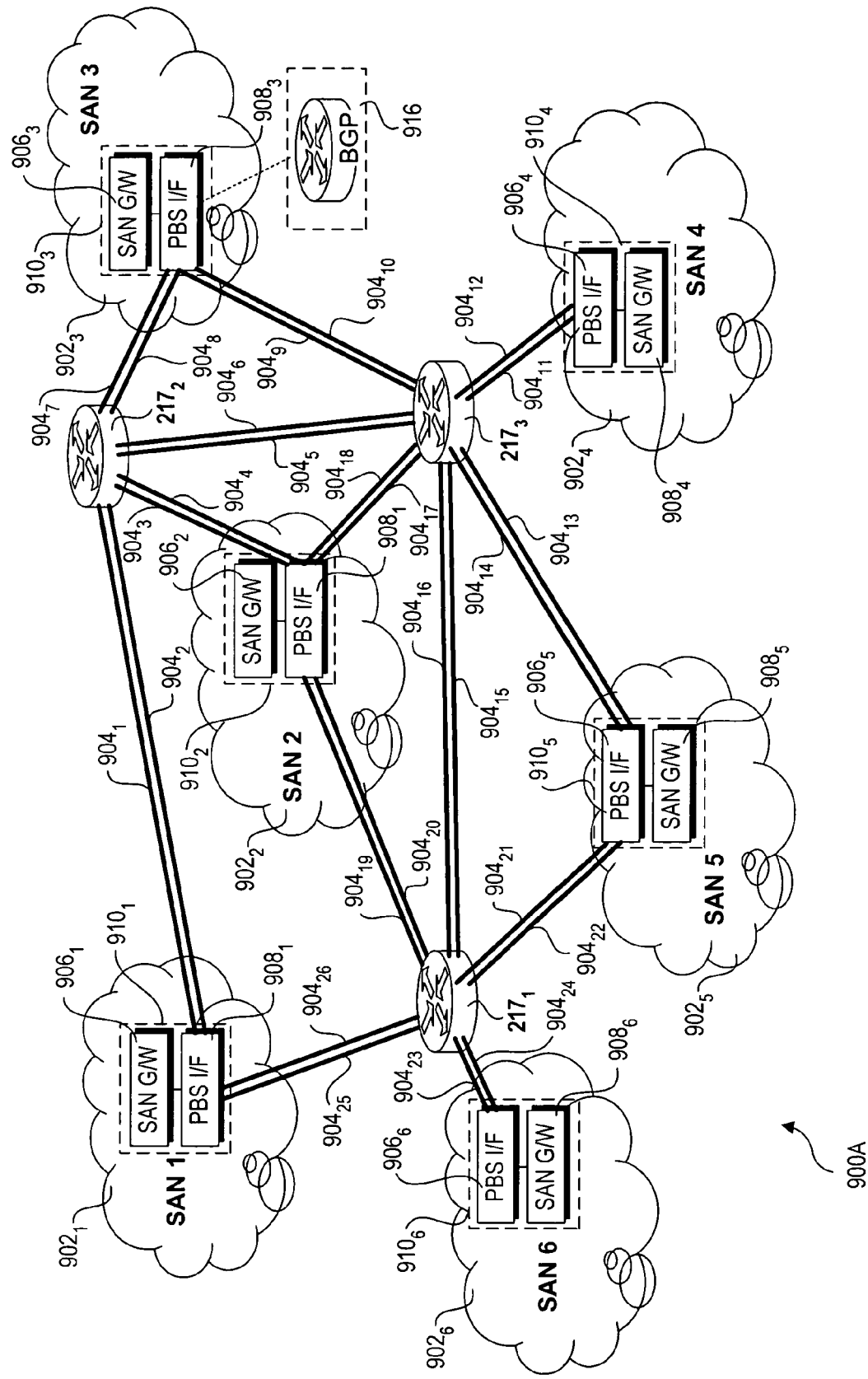
FIG. 9a is a schematic diagram of a network architecture under which multiple SANs are networked using PBS network components, including co-located PBS interface and SAN gateway at the edge node, according to one embodiment of the present invention.

FIG. 9A depicts exemplary network architecture 900A that supports networked communications between multiple SAN islands via optical burst-switched networking components (PBS components in the illustrated embodiment). Network architecture 900 includes six SANs, respectively labeled $902_{1-6}$, which are interconnected via a plurality of PBS switching nodes $217_{1-3}$, and optical links $904_{1-26}$. In the illustrated embodiment, each SAN includes a respective SAN gateway $906_N$, and a co-located PBS interface $908_O$. Collectively, the SAN gateway and PBS interface provide an interface between a SAN and the interior PBS switching nodes of the PBS networking infrastructure. Accordingly, these co-located components appear to the PBS switching nodes as PBS edge nodes $910_{1-6}$.

For illustrative purposes, optical links $904_{1-26}$ are shown in pairs representing the capacity to concurrently transmit data over multiple different wavelengths via a single fiber or a single wavelength over multiple optical fibers. It will be understood that a single optical link may support 1-N concurrent wavelengths under an appropriate WDM implementation. Furthermore, more than one optical fiber link may be employed to connect a pair of nodes, thereby providing a redundancy in case of link failure or to support increased traffic.

Network architecture 900A enables SANs $902_{1-6}$ to communicate with each other via the PBS fabric. In order to support this capability, it is necessary to provide appropriate communication interfaces to support the internal workings of each of the SAN and PBS network infrastructures. As discussed above, this is enabled via the combination of a SAN gateway and a PBS interface. To better understand the underlying operations of the SAN side of this interface, basic SAN operation is now discussed. There are numerous SAN resources that are readily available to those skilled in the networking arts that provide further details of the SAN aspects discussed below.

The operation of a SAN was designed to support a variety of different platform and networking technologies. Rather than make SAN a restrictive network, an open standard has been developed to enable network interoperability between various vendor components. The underlying data transport for SANs is based on the Fibre Channel (FC) standard. Although the name implies the use of optical fiber links, both optical and copper links of various sorts may be used, including both coax and twisted pair wire links. Fibre Channel is the general name of an integrated set of standards being developed by the American National Standards Institute (ANSI) (X3T9.3 Task Group of ANSI: Fibre Channel Physical and Signaling Interface (FC-PH)); the latest FC-PH draft is available at http://www.t11.org/index.htm.

In Fibre Channel terms, the network infrastructure connecting the end devices (i.e., servers and storage devices) is called the Fabric. A Fibre Channel comprises two unidirectional fibers transmitting in opposite directions with associated transmitter and receiver, wherein each fiber is attached to a transmitter of a port at one end and a receiver of another port at the other end. When a Fabric is present in the configuration, the fiber may attach to a node port (N_Port) and to a port of the Fabric (F_Port).

Figure 10:
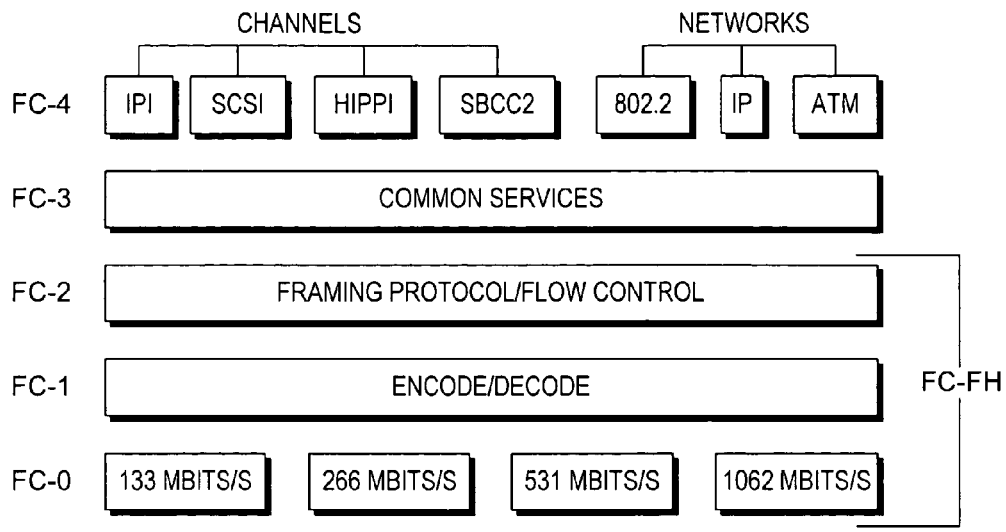
FIG. 10 is a diagram illustrating how Fibre Channel is structured as a layered set of hierarchical functions.

Referring to FIG. 10, Fibre Channel is structured as a layered set of hierarchical functions. The lowest layer (FC-0) defines the physical link in the system, including the fibre, connectors, optical and electrical parameters for a variety of different data rates. It also specifies a safety system—the Open Fiber Control system—for shortwave laser data links, since the optical power levels in a fiber link may exceed the limits defined by applicable laser safety standards. In essence, a detection of a broken fiber causes the laser duty cycle to be automatically reduced to meet safety requirements.

The FC-1 layer defines the transmission protocol including serial encoding and decoding rules, special characters and error control. The information transmitted over a fiber is encoded 8 bits at a time into a 10 bit Transmission Character. The primary rationale for use of a transmission code is to improve the transmission characteristic of information across a fiber.

The Signaling Protocol (FC-2) layer serves as the transport mechanism of Fibre Channel. The framing rules of the data to be transferred between ports, the different mechanisms for controlling the three service classes and the means for managing the sequence of data transfer are defined by FC-2. To aid in the transport of data across the link, the following building blocks are defined by the standard: Ordered Set, Frame, Sequence, Exchange, and Protocol. These are all well-known to those skilled in the art. For the purpose of the embodiments herein, the FC frame is the most important aspect of FC-2, and accordingly, only brief description of Ordered Set, Sequence, Exchange, and Protocol are described below; each of these is well-known in the SAN art.

The Ordered Sets are four byte transmission words used to obtain bit and word synchronization, which also establishes word boundary alignment. Three major types of Ordered Sets are defined by the signaling protocol, including Frame delimiters, Primitive Signals, and Primitive Sequences.

The basic building blocks of an FC connection are the Frames. The Frames contain the information to be transmitted (i.e., payload), the address of the source and destination ports, and link control information. Frames are broadly categorized as Data frames and Link_control frames. Data frames may be used as Link_Data frames and Device_Data frames, link control frames are classified as Acknowledge (ACK) and Link_Response (Busy and Reject) frames. The primary function of the Fabric is to receive the Frames from the source port and route them to the destination port. It is the FC-2 layer's responsibility to break the data to be transmitted into Frame size, and reassemble the Frames.

Figure 11:
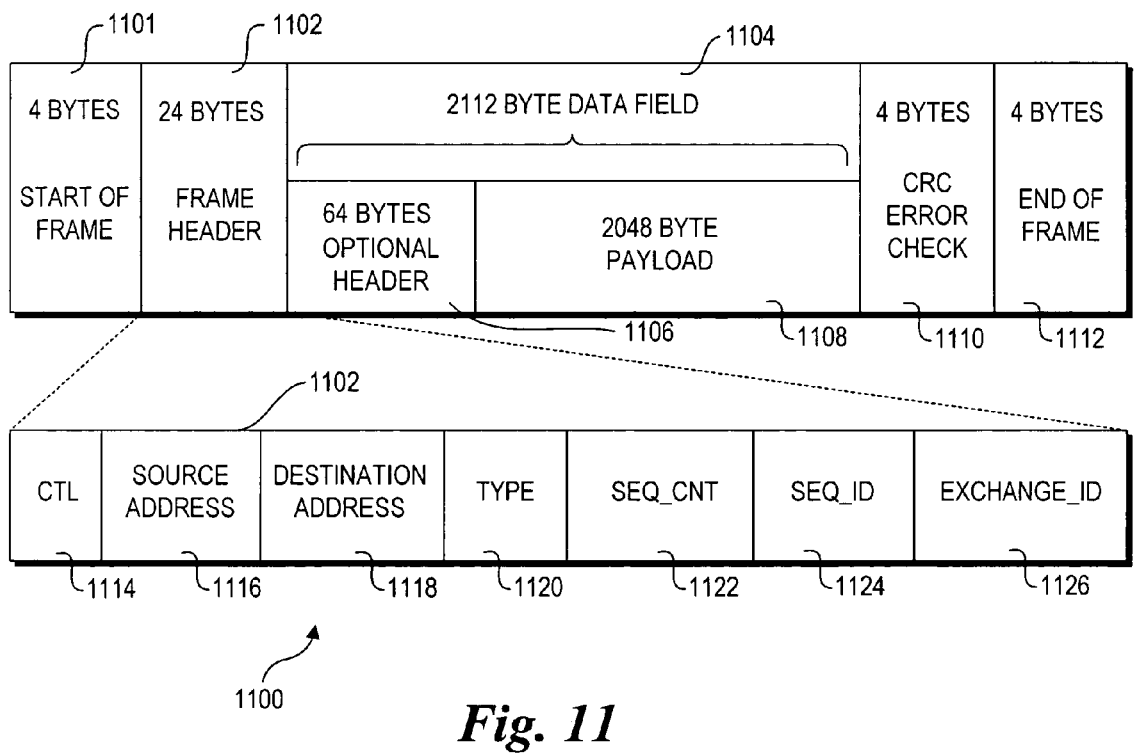
FIG. 11 is a diagram showing the format of a Fibre Channel frame (FC-2)

The format of an FC frame 1100 is shown in FIG. 11. Each Frame begins and ends with a Frame Delimiter. The Frame delimiters (the Start-of-Frame (SOF) delimiter 1101 and End-of-Frame (EOF) delimiter 1112) are Ordered Sets that immediately precede or follow the contents of a Frame. A Frame Header 1102 immediately follows SOF delimiter 1101. The Frame Header is used to control link applications, control device protocol transfers, and detect missing or out of order Frames. A maximum 2112 byte long data field 1104 contains the information to be transferred from a source N_Port to a destination N_Port. The payload may include an optional header 1106 containing additional link control information, and includes a maximum 2048 byte data payload 1108. A 4 byte Cyclic Redundancy Check (CRC) 1110 precedes EOF delimiter 1112. The CRC is used to detect transmission errors.

Further details of frame header 1102 are shown at the lower portion of FIG. 11. The frame header includes a control CTL field 1114, followed by Source and Destination address fields 1116 and 1118 and a type field 1120. The next two fields, including a sequence count (seq_cnt) field 1122 and a sequence identification (seq_ID) field 1124 contain sequence information. A Sequence is formed by a set of one or more related Frames transmitted unidirectionally from one N_Port to another. Each Frame within a sequence is uniquely numbered with a Sequence Count. Error recovery, controlled by an upper protocol layer is usually performed at Sequence boundaries.

An exchange_ID field 1126 is the last frame header field. An Exchange comprises one or more non-concurrent sequences for a single operation. Exchanges may be unidirectional or bidirectional between two N_Ports. Within a single Exchange, only one sequence may be active at any one time, but Sequences of different Exchanges may be concurrently active.

The Protocols are related to the services offered by Fibre Channel. Protocols may be specific to higher-layer services, although Fibre Channel provides its own set of protocols to manage its operating environment for data transfer. The Protocols are specified by the aforementioned ANSI standard.

Flow control is the FC-2 layer control process to pace the flow of Frames between N_Ports and between an N_Port and the Fabric to prevent overrun at the receiver. Flow control is dependent upon the service classes. Class 1 Frames use end-to-end flow control, class 3 uses only buffer-to-buffer, class 2 Frames use both types of flow control.

The FC-3 level of the FC standard is intended to provide the common services required for advanced features. These include: Striping—To multiply bandwidth using multiple N_ports in parallel to transmit a single information unit across multiple links; Hunt groups—The ability for more than one Port to respond to the same alias address. This improves efficiency by decreasing the chance of reaching a busy N_Port; and Multicast—Multicast delivers a single transmission to multiple destination ports. This includes sending to all N_Ports on a Fabric (broadcast) or to only a subset of the N_Ports on a Fabric.

FC-4, the highest layer in the FC structure, defines the application interfaces that can execute over FC. It specifies the mapping rules of upper layer protocols using the FC levels below. FC is equally adept at transporting both network and channel information and allows both protocol types to be concurrently transported over the same physical interface.

The following network and channel protocols are currently specified or proposed: Small Computer System Interface (SCSI); Intelligent Peripheral Interface (IPI); High Performance Parallel Interface (HIPPI) Framing Protocol; Internet Protocol (IP); ATM Adaptation Layer for computer data (AAL5); Link Encapsulation (FC-LE); Single Byte Command Code Set Mapping (SBCCS); and IEEE 802.2.

To efficiently accommodate data transmissions across a SAN-to-PBS network interface, a formatting mechanism is provided that embeds Fibre Channel frames within PBS payloads. Details of a PBS data burst payload 1200 containing multiple FC frames, according to one embodiment, is shown in FIG. 12. A PBS generic burst header 702A includes many of the fields described above for PBS generic burst header 702 shown in FIGS. 7 and 8. In further detail, the Payload Type field 712A may be used to identify different payloads types. In one embodiment, the following 4-bit values are used:

| | | |
|---|---|---|
| 0000 | | No payload |
| 0001 | | Control Burst |
| 0010 | | Network management burst |
| 0100 | | Reserved |
| 1XXX | | Data payload such as: |
| | 1111 | IP packets |
| | 1001 | Ethernet frames |
| | 1101 | FC frames |
| | 1011 | MPEG-1/2/4 Video frames |

A PBS payload header 732A includes a 20-bit reserved field 1202, and a segment ID (S-ID) field 1204, which is used for storing an identifier (ID) for re-assembling a segmented data burst. In this embodiment, segment ID field 704 is an 8-bit field (bits 20-27) calculated by control burst builder 626 (FIG. 6) or control burst processor 632.

PBS payload header 732A also includes a segment burst indicator (SB) field 1208, a concatenated payload indicator (CPI) field 1210 and a payload PCS (PH) field 1212. These fields are respectively used to indicate whether: the PBS data burst is segmented; the burst payload is concatenated; and a payload FCS is present. In the illustrated embodiment, fields 1208, 1210 and 1212 are 1-bit field (bits 29, 30 and 31, respectively). In other embodiments, these fields may be mapped to different bits, or in words other than the first word of PBS payload header 732A. Unlike a PBS payload header for a PBS control burst, this embodiment of a PBS payload header for a data burst has only one 32-bit word. However, the PBS payload header for a PBS data burst in other embodiments may be more than word in length.

The payload data 734A is configured as one or more FC frames 1100, wherein each respective frame includes a PBS burst payload length 1214A. For example, the illustrated embodiment includes three FC frames 1100A, 1100B, and 1100C in the payload, with respective PBS burst payload lengths 1214A, 1214B, and 1214C. Each FC frame has a configuration similar to that described above with reference to FIG. 11. Each of the PBS burst payload length 1214A or 1214B or 1214C contains a value corresponding to the length of a respective FC frame 1100A/B/C.

Figure 13:
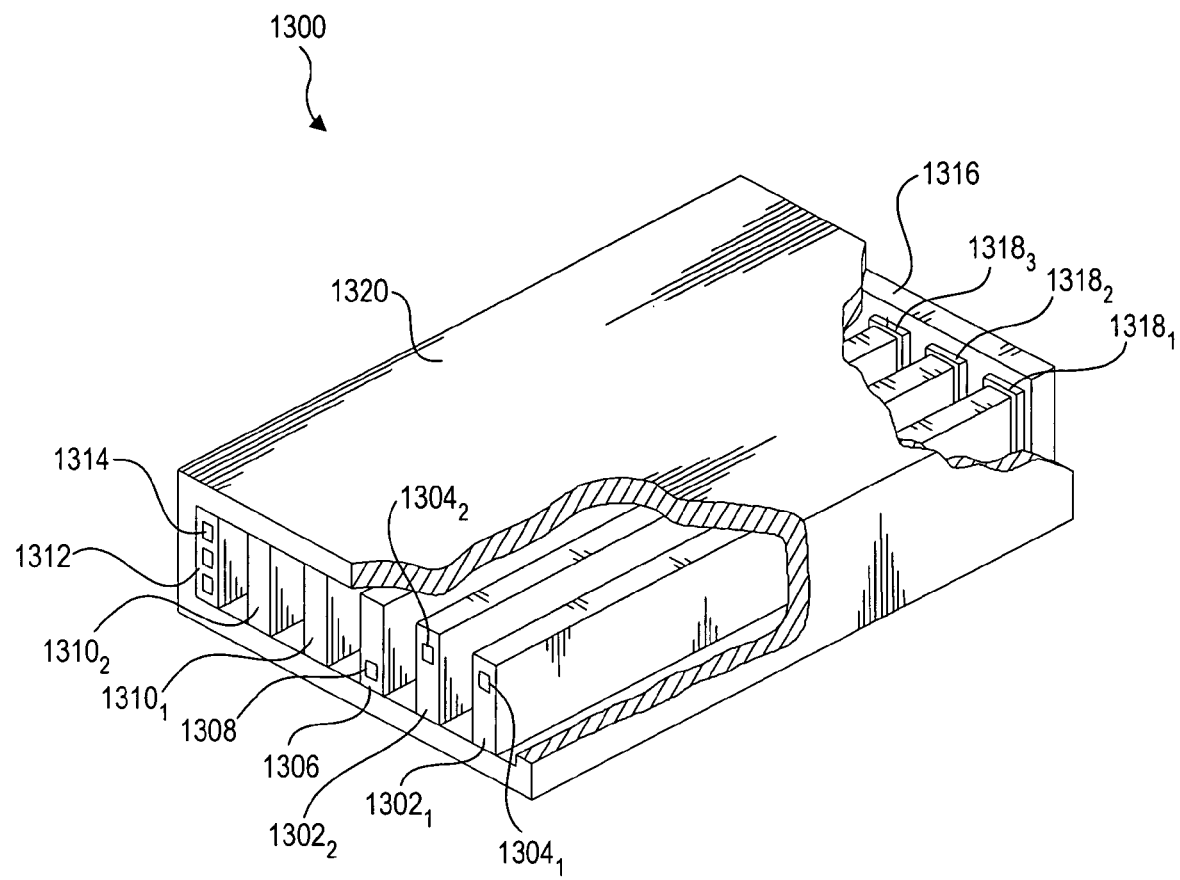
FIG. 13 is a diagram illustrating a co-located SAN Gateway/PBS edge node unit, according to one embodiment of the present invention.

As discussed above, in one embodiment the functionality provided by a SAN gateway and a PBS interface may be co-located in a single unit. For example, FIG. 13 illustrates a modular reconfigurable SAN gateway/PBS edge node unit 1300, according to one embodiment of the present invention. In this embodiment, unit 1300 includes a pair of optical PBS I/O cards or modules 1302₁ and 1302₂ having respective optical ports 1304₁ and 1304₂, a legacy interface card or module 1306 having a legacy network port 1308, multiple configurable server modules 1310₁-1310ₙ (only two of which are shown), one or more Fibre Channel interface cards 1312 including FC ports 1314, a backplane 1316, connectors 1318₁-1318ₘ (only connectors 1316₁-1316₃ are visible in FIG. 13) and a chassis 1320. In some embodiments, unit 1300 may include fewer or more than two configurable server modules, and fewer or more than two optical PBS I/O cards. In other embodiments, unit 1300 maybe differently configured from the embodiment shown in FIG. 13. One embodiment of optical PBS I/O module 1302 is described below in conjunction with FIGS. 14*a* and 14*b*. In one embodiment, the various modules and cards comprise blade servers that are located in a blade server chassis. In one embodiment, unit 1300 is configured in accordance with the Advanced Telecom Computing Architecture (Advanced TCA or ATCA) standard (PICMG 3.0) (PCI Industrial Computer Manufacturing Group).

In this embodiment, legacy interface card 1306 is a gigabit Ethernet (GbE) card for communicating with a leading edge router (LER) or other LAN/WAN networks using a GbE Ethernet protocol. In other embodiments, different legacy protocols can be used.

In this embodiment, server modules $1310_1$-$1310_N$ are self-contained high-speed server blades, where a single or multiple server functions are implemented as a single integrated blade.

In some embodiments, backplane 1316 includes an electronic switching fabric with buffers and with electrical buses (see switching fabric 1430 of FIG. 14*a*), power supply, control, etc., similar to those used in commercially available blade server systems. In one embodiment, the electronic backplane fabric supports multiple switching topologies such as a star or double-star topologies to switch to suitable electrical interfaces e.g., Peripheral Component Interconnect (PCI) (e.g., PCI Specification v2.2, Jan. 25, 1999) or PCI-Express (e.g., PCI-X Specification v.1.0, Sep. 27, 1999), InfiniBand® (e.g., InfiniBand® 1.0 specification Oct. 24, 2000) interfaces in the server modules. In other embodiments, the backplane can include other types of wired switching fabrics. Wired switching fabrics as used herein can also refer to optical switching fabrics or combination of optical and electrical switching fabric.

The elements of unit 1300 are interconnected as follows. Optical I/O modules $1302_1$ and $1302_2$, legacy interface module 1306, server modules $1310_1$-$1310_N$ and Fibre Channel interface card(s) 1312 are connected to backplane 1316 (and the aforementioned electrical switching fabric 1430) via connectors $1318_1$-$1318_M$. Optical ports $1304_1$ and $1304_2$ are connected to respective PBS network switching nodes 217 (e.g., of PBS network 200 in FIG. 2). Legacy port 1308 is connected to a legacy network (LAN or WAN) or LER (e.g., see FIG. 2). Chassis 1320 houses and physically supports the modules, connectors and backplane. Chassis 1320 also includes other components (e.g., power supplies, cooling fan or fans, etc.) that are not shown in FIG. 13 to avoid obscuring the invention.

In operation, unit 1300 can function as a SAN gateway to enable connectivity with various storage devices host by a given SAN. For example, in one embodiment, data traffic between the clients external to the SAN and data hosts within a SAN are facilitated via conventional SAN gateway operations that are well-known in the art. SAN gateway modules to support this type of functionality are provided by several vendors, including but not limited to the IBM Corporation, White Plains, N.Y. For example, one or more of server modules $1310_1$-$1302_N$ may facilitate SAN gateway operations.

In addition, unit 1300 may provide services to a client via the PBS network and optical I/O modules $1302_1$ and $1302_2$. However, unlike in a conventional network protocols, optical I/O modules $1302_1$ and $1302_2$ receives optical PBS control and data burst(s) from the client, which are then O-E converted, de-framed, de-multiplexed, and routed as described below. In one embodiment, Optical I/O modules $1302_1$ and $1302_2$ provide information to route the incoming traffic to an appropriate server module via backplane 1316 in the same manner as a server module would transfer information over backplane 1316.

Similarly, a server module of unit 1300 passes information to a PBS network via backplane 1316, and an optical PBS I/O module 1302. Unlike conventional network protocol devices, in one embodiment optical PBS I/O module 1302 statistically multiplexes the incoming traffic flows (e.g., FC frames) from one or more server modules to form PBS control and data bursts in substantially the same manner as previously described for an ingress node of a PBS network 200 (FIG. 2). The PBS burst(s) are then framed, scheduled, E-O converted and transmitted to the client via the PBS network as previously described for PBS network 200.

Traffic coming into unit 1300 from a legacy network for transfer to a destination via the PBS network is received by unit 1300 at legacy port 1308. As previously stated, the legacy network can use a conventional networking protocol such as, for example, TCP/IP or Ethernet protocols. In this embodiment, the legacy network is an electrical GbE network, although other wired or wireless networks can be used in other embodiments. Legacy interface module 1306 transmits the information received at legacy port 1308 to an optical I/O PBS module 1302 via backplane 1316 in the same manner as any server module transfers information over backplane 1316. Optical PBS I/O module 1302 forms the information from legacy interface module 1308 into PBS burst(s) in substantially the same manner as previously described for an ingress node of a PBS network 200. The PBS burst(s) are then scheduled, E-O converted and transmitted to the client via the PBS network as previously described for PBS network 200.

Traffic coming into unit 1300 from a PBS network for transfer to a SAN destination is received by unit 1300 at a PBS optical port 1304 in the form of optical control and data PBS burst(s). Optical PBS I/O module 1302 O-E converts the optical control and data burst(s) received at PBS optical port 1304, de-frames the PBS burst(s), and de-multiplexes PBS data bursts into individual flows consisting, for example, FC frames 1100. Then, the individual flows are transferred to an appropriate one of server modules via backplane 1316. That server module, which functions as a SAN gateway, then transfers the individual traffic flows to the SAN via an appropriate FC port 1314 on Fibre Channel card 1312.

Figure 14A:
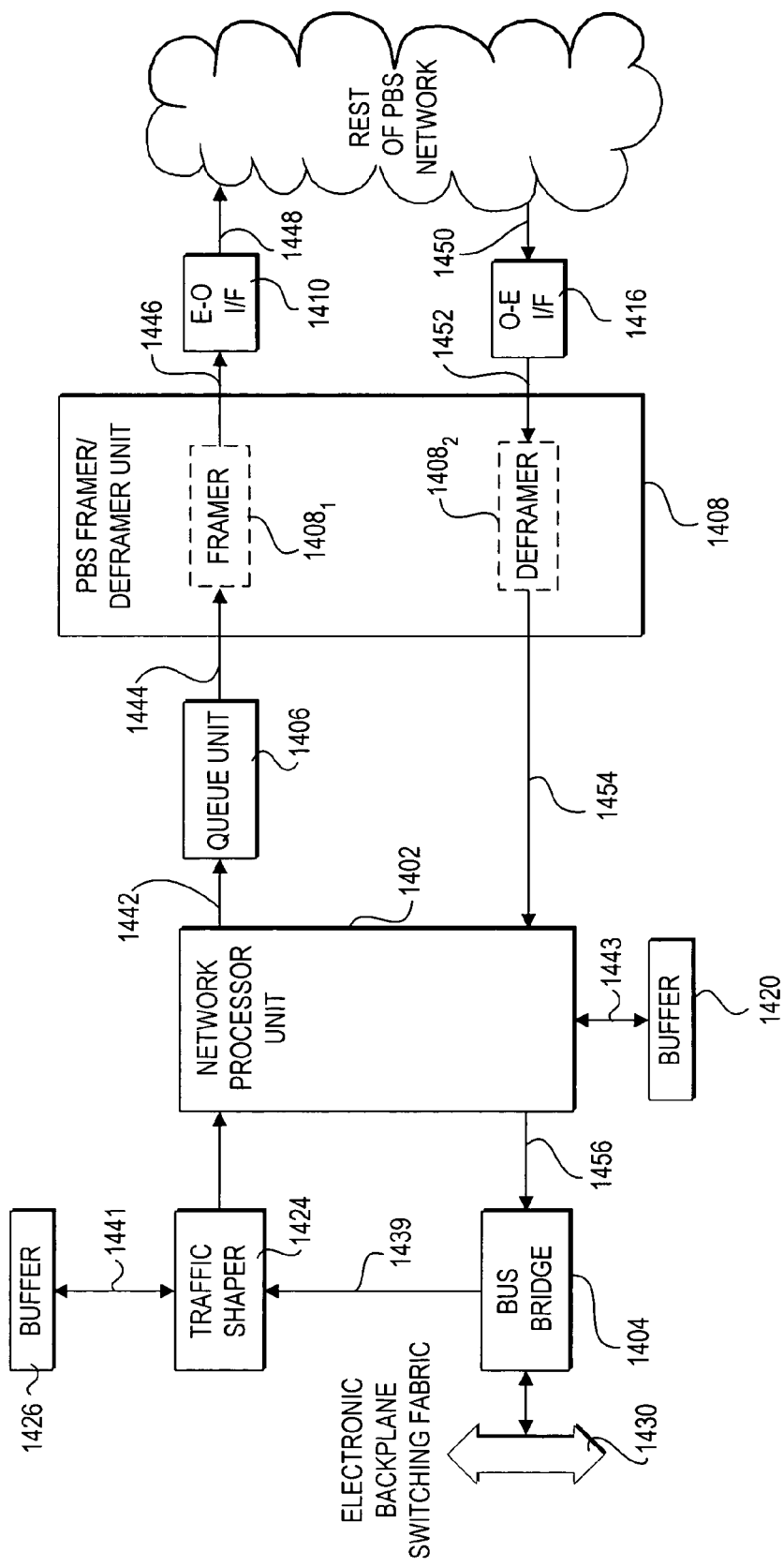
FIG. 14a is a block diagram illustrating an optical PBS I/O card depicted in FIG. 13, according to one embodiment of the present invention.

FIG. 14*a* illustrates optical PBS I/O module 1302, according to one embodiment of the present invention. In this embodiment, optical PBS I/O module 1302 includes a network processor unit 1402 (this module could have multiple network processors), a bus bridge 1404, a queue unit 1406, a framer unit 1408 (having framer and de-framer functions as indicated by blocks $1408_1$ and $1408_2$), an E-O interface 1410, an O-E interface 1416, a network processor buffer 1420, a traffic shaper 1424 and a traffic shaper buffer 1426. In one embodiment, backplane switching fabric 1430 includes a PCI Express bus, although any other suitable buses may be used in other embodiments. Thus, bus-bridge 1404 can be implemented using a commercially available PCI bridge device or chip set.

In this embodiment, the foregoing elements of optical PBS I/O unit 1302 are interconnected as follows. Bus bridge 1404 is connected to backplane switching fabric 1430 to support parallel bi-directional traffic via interconnect 1438. Bus bridge 1404 is also connected to traffic shaper 1424 via an electrical interconnect 1439. Electrical interconnects 1438, 1439 and other signal interconnects in FIG. 14*a* are depicted as single interconnect wire (even though the connection may include several signal interconnect wires) for clarity.

Traffic shaper 1424 is connected to network processor unit 1402 and buffer 1426 via interconnects 1440 and 1441, respectively. Network processor unit 1402 is connected to queue unit 1406 and buffer 1420 via interconnects 1442 and 1443, respectively. Queue unit 1406 is in turn connected to PBS framer/de-framer unit 1408 via an interconnect 1444.

Figure 14B:
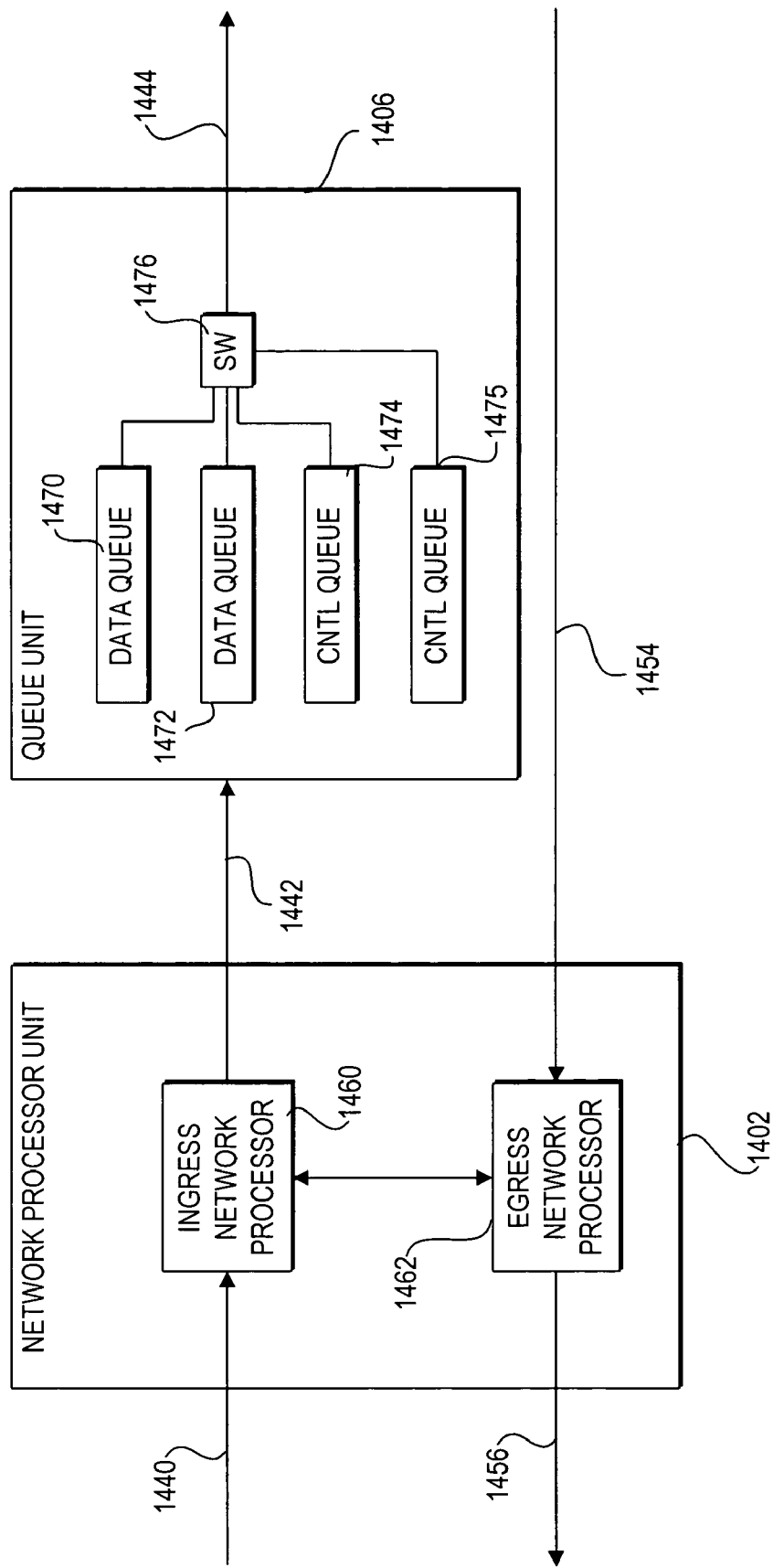
FIG. 14b is a block diagram illustrating in more detail the network processor unit and the queue unit depicted in FIG. 17a, according to one embodiment of the present invention.

As shown in FIG. 14*b*, in some embodiments network processor unit 1402 includes an ingress network processor 1460 and an egress network processor 1462. Thus, in some embodiments of optical PBS I/O module 1302, interconnects 1440 and 1442 are connected to ingress network processor 1460.

Further, as shown in FIG. 14*b*, in some embodiments, queue unit 1406 can include data queues 1470 and 1472, control queues 1474, and 1475 and an electrical switch or demultiplexer 1476 coupled to the output ports of queues 1470, 1472, 1474 and 1475. Thus, in some embodiments, the input ports of queues 1470, 1472, 1474 and 1475 are connected to interconnect 1442 via a switch or multiplexer (not shown). In addition, in some embodiments, the output port of switch 1476 can be connected to interconnect 1444.

In other embodiments, a different number of processors (e.g., a single processor) can be used in network processor unit 1402. Further, in some embodiments, a different number of queues can be used in queue unit 1406. For example, queue unit need not include a dedicated control queue and/or two data queues. Multiple queues can be used to provide storage for building multiple bursts with different properties such as different priorities.

Referring again to FIG. 14*a*, PBS framer unit 1408 is connected to E-O interface 1410 via an interconnect 1446. E-O interface 1410 is in turn is connected to the rest of a PBS network via an interconnect 1448. O-E interface 1416 connected to the rest of the PBS network via a interconnect 1450. In general, O-E interface 1416 can receive all the transmitted wavelengths on an interconnected SAN—either it has a tunable optical burst receiver or multiple fixed wavelength optical burst receivers. O-E interface 1416 is also connected to framer unit 1408 via an interconnect 1452. Framer unit 1408 is also connected to network processor unit 1402 via a interconnect 1454. In one embodiment, an interconnect 1464 is connected to network processor 1462 (FIG. 14*b*). Network processor unit 1402 is connected to bus bridge 1404 via an interconnect 1456. The operation of optical PBS I/O module 1302 in transferring information to and from the PBS network is described below in conjunction with FIGS. 15 and 16.

Figure 15:
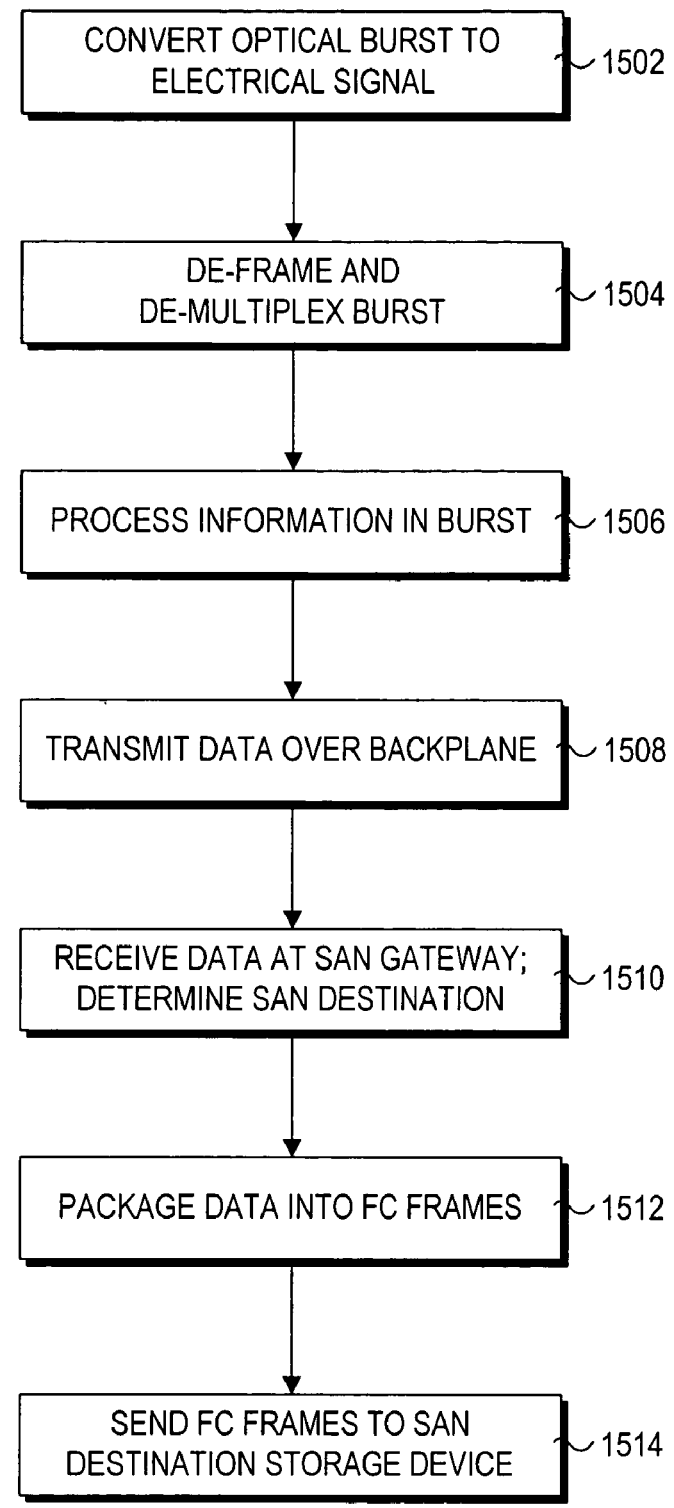
FIG. 15 is a flow diagram illustrating an egress operational flow, according to one embodiment of the present invention.

Referring to FIGS. 14*a-b* and a flowchart 1500 of FIG. 15, optical PBS I/O module 1302 performs PBS egress operations (i.e., transferring information from the PBS network to a legacy network and/or server module of unit 1300) as follows. Optical PBS I/O module 1302 converts an optical PBS burst received from the PBS network via an interconnect 1450 into electrical signals. In this embodiment, O-E interface 1416 performs the O-E conversion. This operational flow is represented by a block 1502.

The received O-E converted PBS burst is then de-framed and de-multiplexed. In this embodiment, framer unit 1408 receives the O-E converted PBS burst from O-E interface 1416 via interconnect 1452 and de-frames the PBS burst. For example, in one embodiment, the PBS burst may be framed as described above with reference to FIGS. 7 and 8. In other embodiments, a different framing format may be used. De-multiplexing enables each framed data burst to be separated into the corresponding IP packets, Ethernet frames, FC frames, etc. This operational flow is represented by a block 1504.

The information included in the PBS burst is then processed. In this embodiment, network processor unit 1402 receives the de-framed and de-multiplexed PBS burst from framer unit 1408 via interconnect 1454 and performs the processing. For example, in some embodiments, network processor unit 1402 can extract address and payload information, perform error correction on header and/or payload information, concatenate a payload, re-assemble segmented payloads, etc. Network processor unit 1402 can use buffer 1420 to temporarily store information during the above processing operations. In one embodiment, egress network processor 1462 (FIG. 14*b*) processes the de-framed burst. This operational flow is represented by a block 1506.

The processed information is then transmitted over backplane switching fabric 1430. In this embodiment, bus bridge 1404 receives the processed information from network processor unit 1402 via an interconnect 1456 and transmits the information over backplane switching fabric 1430 to the proper destination, in the proper format, and with proper bus control signals (e.g., according to the PCI protocol). The destination for the information may be, for example, a device connected to the legacy network (in which case the information is transmitted to legacy interface module 1306) or a server module (i.e., one of server modules $1310_1$-$1310_N$). This operational flow is represented by a block 1508.

Flowchart 1500 includes additional operations in blocks 1510-1514 specific to forwarding the data to be stored on a SAN storage device. The data that is transmitted over the backplane in block 1508 is received by one of server modules $1510_1$-$1510_N$. The server module, which provides SAN gateway functionality, identifies then SAN destination to which the data is to be forwarded for storage. These operations are represented by block 1510. In accordance with blocks 1512 and 1514, the data is packaged into FC frames and the FC frames are sent to the destination san storage device using applicable SAN data transmission techniques.

Figure 16:
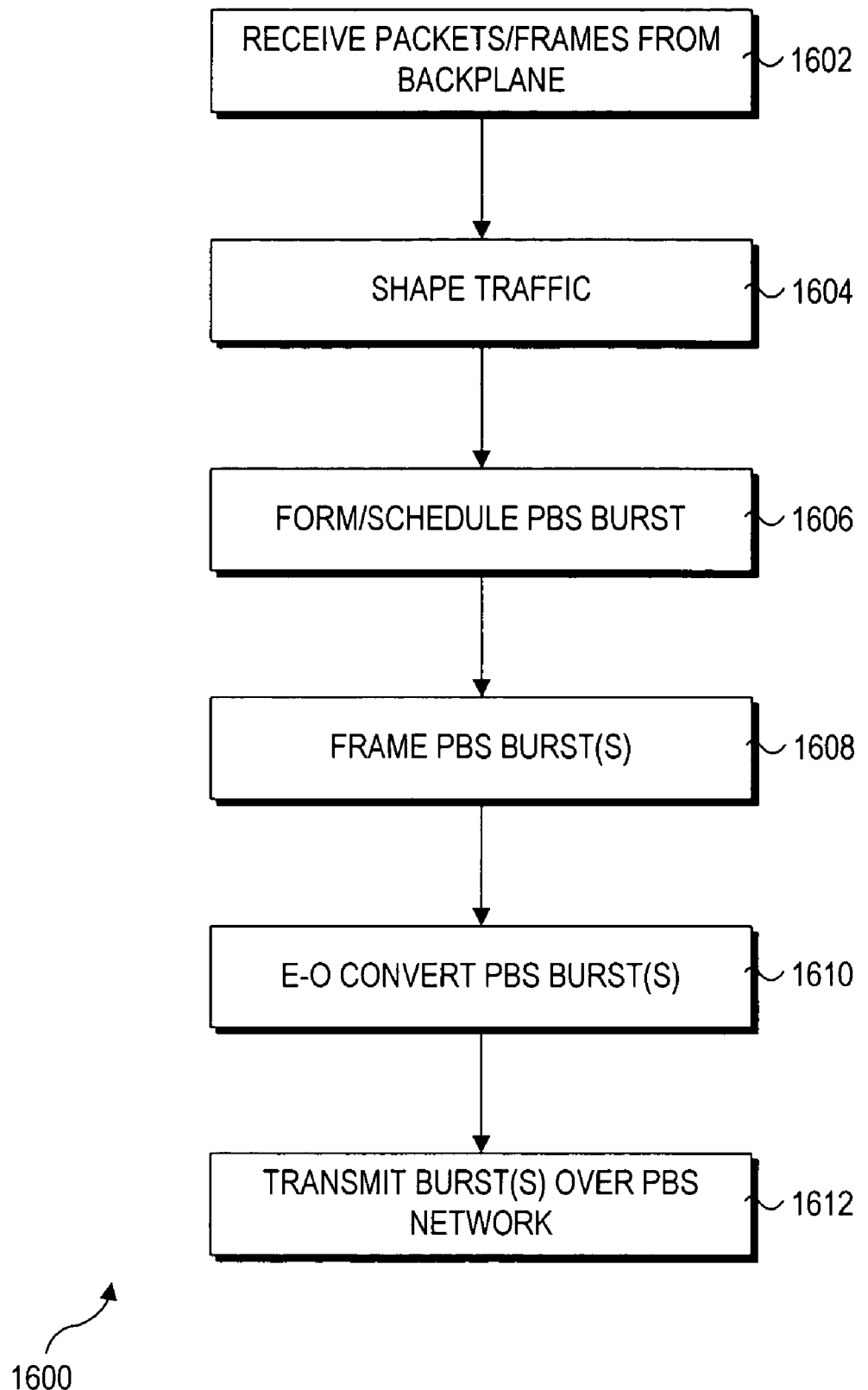
FIG. 16 is a flow diagram illustrating an egress operational flow, according to one embodiment of the present invention.

Referring to FIGS. 14*a-b* and a flowchart 1600 of FIG. 16, optical PBS I/O module 1302 performs PBS ingress operations; i.e., transferring information to the PBS network from a legacy network and/or server module of unit 1300 as follows. Optical PBS I/O module 1302 receives information to be transmitted over a PBS network in the form of electrical signals. In this embodiment, bus bridge 1404 receives the information from backplane switching fabric via an interconnect 1438. In this embodiment, this information can come from the legacy network via legacy interface 1306 or from one of server modules $1510_1$-$1510_N$. This operational flow is represented by a block 1602.

The received information is then shaped to help improve traffic flow in the PBS network (e.g., PBS network 300 of FIG. 3). In this embodiment, traffic shaper 1424 receives the information from bus bridge 1404 via interconnect 1439 and shapes the information. For example, in one embodiment, traffic shaper 1424 performs operations on the information to reduce the correlation structures and long-term dependence of the incoming traffic flows caused by the self-similarity effect. Traffic shaper 1424 can be configured to perform any suitable traffic-shaping algorithm or technique known in the art. Traffic shaper 1424 can use buffer 1426 to temporarily store information while performing traffic shaping operations. This operational flow is represented by a block 1604.

The shaped information is then multiplexed into PBS control and data bursts. In this embodiment, network processor unit 1402 receives the shaped information from traffic shaper 1424 via interconnect 1440. Network processor unit 1402 then processes the information to form and schedule PBS control and data bursts as described above for ingress nodes in PBS network 300. In other embodiments, the information is assembled into suitable burst sizes based on the selected burst assembly algorithms to be transmitted over an optical burst network (not necessarily a PBS network). In one embodiment, ingress network processor 1460 (FIG. 14b) processes the traffic shaped information. Further, in this embodiment, network processor unit 1402 uses queue unit 1406 to store the control and data bursts as they are being formed and until they are scheduled for transmission over the PBS network. This operational flow is represented by a block 1606.

The bursts are then encapsulated into frames for transmission over the PBS network. In this embodiment, framer unit 1408 receives the bursts from queue unit 1406 via interconnect 1444 and performs the framing operation. In one embodiment, the bursts are framed as described above with reference to FIGS. 7 and 10. In other embodiments, different framing formats can be used. This operational flow is represented by a block 1608.

The framed bursts are then converted to optical signals and transmitted over the PBS network at the scheduled times. In this embodiment, E-O interface 1410 receives the framed bursts (i.e., PBS control and data bursts) from framer unit 1408 via interconnect 1446. E-O interface 1410 then performs the E-O conversion and transmits the optical signals at the scheduled time and in the reserved PBS TDM channel of the PBS network. This operational flow is represented by blocks 1610 and 1612.

Figure 9B:
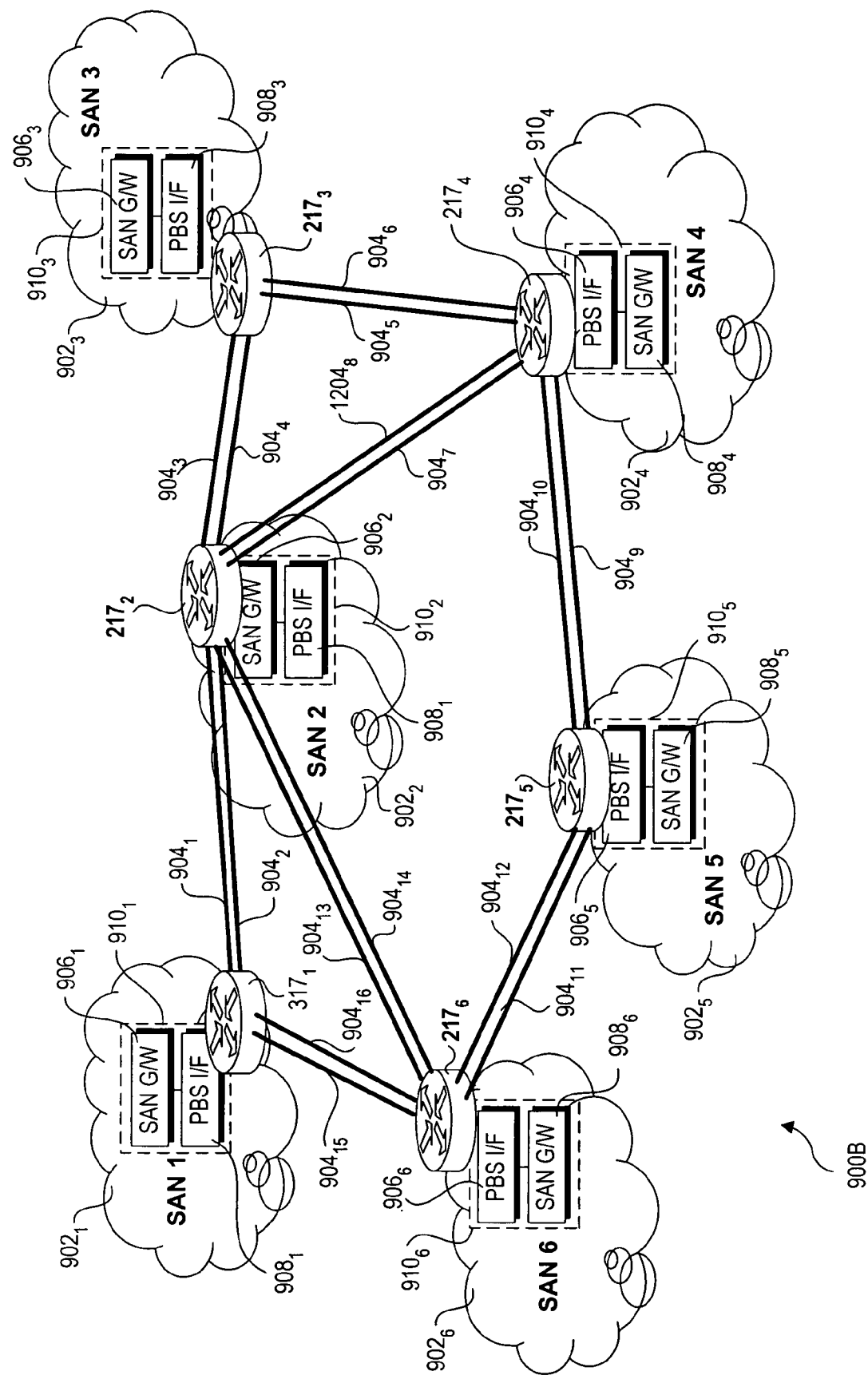
FIG. 9b is a schematic diagram of a network architecture under which multiple SANs are networked using PBS network components, including co-located PBS switching/edge nodes that function as Border Gateway Protocol (BGP) routers, according to one embodiment of the present invention.

In accordance with further aspects of this disclosure, PBS edge, switching and routing facilities may be co-located at a SAN gateway. For example, FIG. 9B shows a network architecture 900B that includes similar components to those shown in FIG. 900A and discussed above. However, in this embodiment, PBS switching modules $217_{1-6}$ are co-located at respective SAN gateways $906_{1-6}$. The various switching PBS switching modules $217_{1-6}$ are linked in communication via optical links $904_{1-16}$.

Although the use of co-located PBS switching modules may require additional modules when compared to the embodiment of FIG. 9A, it eliminates the need for standalone PBS switching nodes, resulting in more flexible network architecture with lower network implementation costs. A PBS switching module, via interaction with its co-located SAN gateway, dynamically provisions a requested lightpath, reserves ahead the necessary bandwidth and schedules the SAN traffic to be transmitted to other SANs and/or other LAN/WANs based on traffic priorities, its own allocated resources, and available bandwidth. Consequently, there is a minimal impact on the FC-based data traffic within the SAN.

In one embodiment, SAN-to-SAN network routing within a larger enterprise network is enabled by modifying an external gateway protocol (EGP) used to determine the best available route to a particular SAN network when multiple lightpaths are available. The route selection by the EGP is done via the associated attributes of the specific SAN network. Thus, each lightpath between different SANs is mapped to a given route or a switched connection. In one embodiment, the EGP runs on a dedicated control lightpath but can also run on a separate electrical (e.g. Ethernet) network interconnecting the devices.

In one respect, the routing scheme is similar to that employed for Internet routing, wherein each network domain operates as an autonomous system (AS), and external routing is employed to route data to and through the various AS's by employing an inter-domain routing protocol that is only aware of interconnections between distinct domains, while being unaware of any information about the routing within each domain. In particular, the routing domain used for the Internet is known as the Border Gateway Protocol (BGP), and embodiments of the invention implement an extended version of the BGP protocol that includes provisions for facilitating PBS network-based routing.

In one embodiment, one or more of the co-located switching nodes of the PBS network are designated as "External Gateway Protocol" routers, which run a modified BGP protocol on their interface connections to other neighboring PBS nodes. Thus, all the outgoing and incoming data traffic to a SAN for which one of these co-located switching nodes is designated through the PBS BGP router. In one embodiment, each external gateway protocol router advertises selectively all of its possible routes to some or all of the neighboring BGP routers. In another embodiment, each BGP router is allowed to rank or prioritize the various route advertisements it sends based on the associated attributes as well as other criteria such as bandwidth utilization or end-to-end latency. Thus, a SAN/PBS gateway can easily influence the BGP decision process in the selection of the best route among all the available routes. Advertising the availability of lightpath routes across PBS networks is done using the BGP UPDATE message. The PBS-to-PBS network connectivity is not limited to an all-optical network, but can also include other types of optical physical links such as SONET/SDH or 10 Gb/s Ethernet.

Figure 9C:
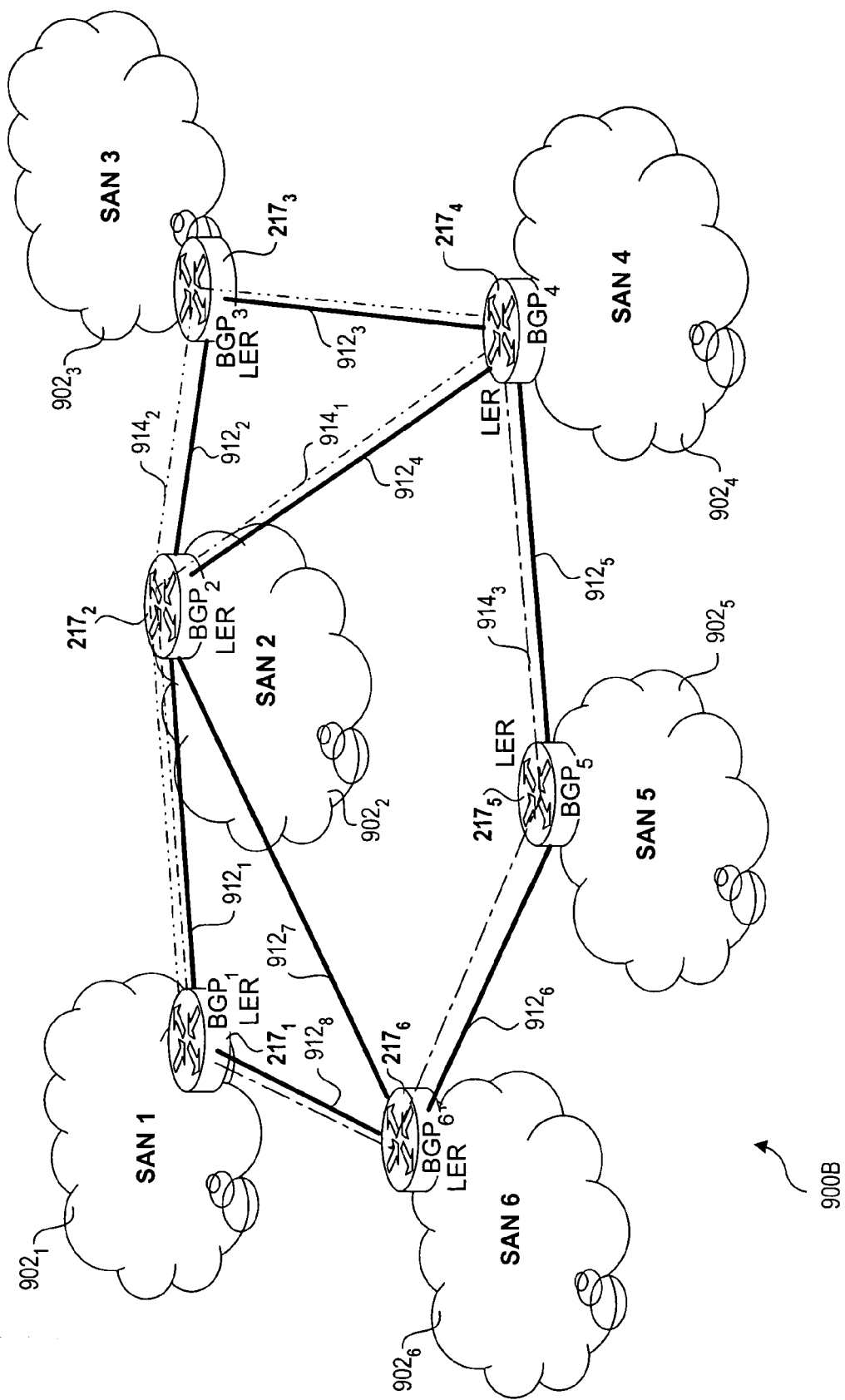
FIG. 9c is a schematic diagram of the network architecture of FIG. 9b from the perspective of the BGP routers.

FIG. 9C shows network architecture 900B as it appears from the perspective of the co-located BGP routers, which include all of the routers shown with a "$BGP_n$" label. In particular, each of the switching nodes $217_{1-6}$ functions as a BGP router, which are connected by various route segments $912_{1-8}$ for illustrative purposes. Under conventional BGP routing, each router maintains a routing table that includes concatenations of routing segments, each collectively comprising a route that passes through that router. However, conventional BGP routing is not concerned with the underlying transport mechanism, and does not consider scheduled usage of routing segments.

As discussed above, after the control burst is sent hop-to-hop from the ingress node to egress node for end-to-end one-way bandwidth reservation with variable time provisioning, the data burst is transmitted (after some offset time) to the egress node along the same lightpath as the control burst. However, the data burst is transparently transmitted through the switching nodes without its content being examined. The PBS switch fabric provides a connection between input and output ports within dynamically reserved time duration, thus allowing the data bursts to be transmitted through, wherein the reserved lightpath constitutes a "virtual optical circuit" coupling the ingress and egress nodes. From the perspective of the PBS edge node BGP routers, the virtual optical circuits appear as direct connections between the BGP router end points, as depicted by a virtual link $914_{1-3}$ between BGP routers $BGB_1$ and $BGP_4$.

From a routing standpoint, the BGP routing network architecture 900B is roughly analogous to BGP routing on the Internet, with acknowledgement that the number of AS's that form the Internet are far more than the number that will be employed in a typical enterprise network. However, the routing principles are similar. As such, much of the routing implementation will be similar to that encountered for conventional BGP routing, using well-known setup and configuration methods.

BGP is the current de facto standard inter-domain routing protocol. BGP first became in Internet standard in 1989 and was originally defined in RFC (request for comment) 1105. It was then adopted as the EGP of choice for inter-domain routing. The current version, BGP-4, was adopted in 1995 and is defined in RFC 1771.

BGP is a path-vector protocol that works by sending route advertisements. Routing information is stored at each BGP router as a combination of destination and attributes of the path to that destination. A route advertisement indicates that reachability of a network (i.e., a network address and a netmask representing block of contiguous IP address. Besides the reachable network and the IP address of the router that is used to reach this network (known as the next hop), a route advertisement also contains the AS path attribute, which contains the list of all the transit AS's that may be used to reach the announced network. The length of the AS path may be considered as the route metric.

The BGP UPDATE message is used to provide routing updates when a change happens within a network. In order to set-up lightpath among different PBS "islands" or networks, the standard BGP needs to be extended to convey the necessary lightpath routing information to the BGP routers. The goal is to leverage the existing BGP properties, but extend them to meet the routing requirements of PBS networks.

A PBS LER (label edge router) is designated as the primary PBS BGP router to support routing among the different optical domains. As shown in FIG. 9C, each of BGP routers $BGP_{1-6}$ are PBS LER candidates, although any number of BGP routers $BGP_{1-6}$ may actually operate as a PBS LER. The PBS BGP router will be responsible to set-up lightpaths by advertising the lightpath attributes to its neighboring BGP routers, and build-up and maintain routing information base (RIB, i.e., a routing table) for all the possible routes. In general, PBS BGP routers and PBS LERs may be co-located at the same network node.

Figure 17:
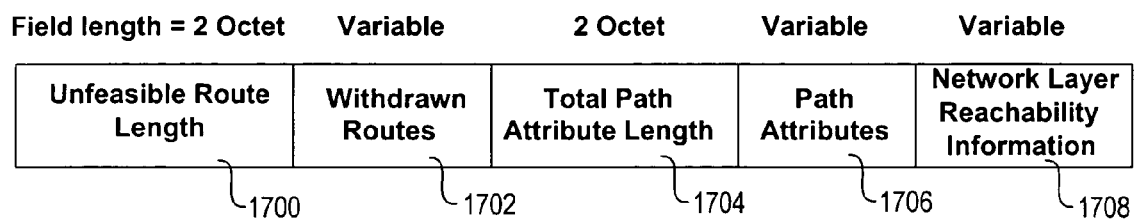
FIG. 17 is a diagram illustrating the various fields in a BGP UPDATE message.

FIG. 17 shows the format of the UPDATE message with its corresponding fields. The update message includes an Unfeasible Route Length field 1700, a Withdrawn Routes field 1702, a Path Attribute Length field 1704, a Path Attributes field 1706, and a Network Layer Reachability Information (NLRI) field 1708. Routes are advertised between a pair of BGP speakers (i.e., BGP routers that are connected to one another via a single hop) in UPDATE messages: the destination is the systems whose IP addresses are reported in NLRI field 1708, and the path is the information reported in the path attributes field 1706 of the same UPDATE message.

The Unfeasible Route Length field 1700 comprises a 2-octet unsigned integer that indicates the total length of the Withdrawn Routes field in octets. Its value must allow the length of the Network Layer Reachability Information field 1708 to be determined as specified below. A value of 0 indicates that no routes are being withdrawn from service, and that the Withdrawn Routes field is not present in this UPDATE message.

The Withdrawn Routes field 1702 is a variable length field that contains a list of IP address prefixes for the routes that are being withdrawn from service. Each IP address prefix is encoded as a 2-tuple that includes a single octet length field followed by a variable-length prefix field. The Length field indicates the length in bits of the IP address prefix. A length of zero indicates a prefix that matches all IP addresses (with prefix, itself, of zero octets). The Prefix field contains IP address prefixes followed by enough trailing bits to make the end of the field fall on an octet boundary.

The Total Path Attribute Length field 1704 comprises a 2-octet unsigned integer that indicates the total length of the Path Attributes field 1706 in octets. A value of 0 indicates that no Network Layer Reachability Information field is present in this UPDATE message.

Figure 17A:
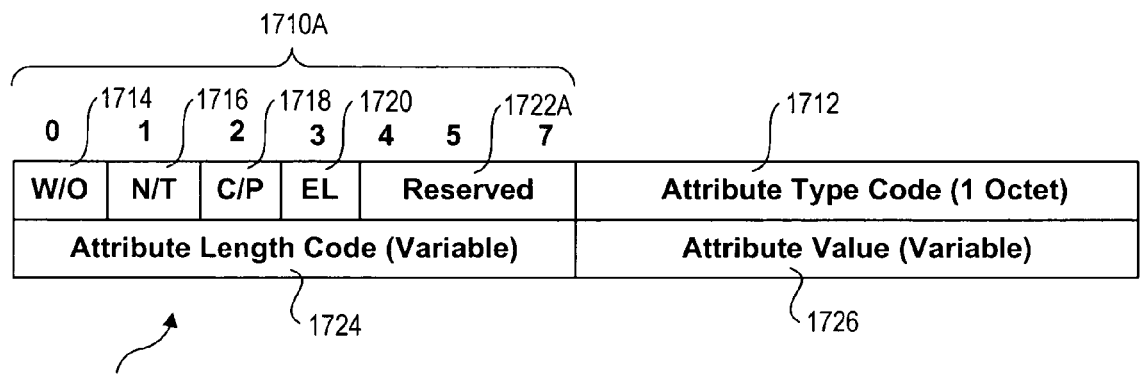
FIG. 17a is a diagram illustrating the various fields corresponding to the path attributes of a conventional BGP UPDATE message.

Details of a conventional Path Attributes field 1706 is shown at 1706A in FIG. 17a. A variable length sequence of path attributes is present in every UPDATE. Each path attribute is a triple of variable length. Attribute Type is a two-octet field that consists of the Attribute Flags octet 1710A followed by an Attribute Type Code octet 1712. The high-order bit (bit 0) of the Attribute Flags octet is the Optional bit 1714. It defines whether the attribute is optional (if set to 1) or well-known (if set to 0).

The second high-order bit (bit 1) of the Attribute Flags octet is the Transitive bit 1716. It defines whether an optional attribute is transitive (if set to 1) or non-transitive (if set to 0). For well-known attributes, the Transitive bit must be set to 1.

The third high-order bit (bit 2) of the Attribute Flags octet is the Partial bit 1718. It defines whether the information contained in the optional transitive attribute is partial (if set to 1) or complete (if set to 0). For well-known attributes and for optional non-transitive attributes the Partial bit must be set to 0.

The fourth high-order bit (bit 3) of the Attribute Flags octet is the Extended Length bit 1720. It defines whether the Attribute Length is one octet (if set to 0) or two octets (if set to 1). Extended Length bit 1720 may be used only if the length of the attribute value is greater than 255 octets.

The lower-order four bits of the Attribute Flags octet are unused, as depicted by reserved field 1722. They must be zero (and must be ignored when received).

The Attribute Type Code octet 1712 contains the Attribute Type Code. Currently defined Attribute Type Codes are discussed in Section 5 of RFC 1771.

If the Extended Length bit 1720 of the Attribute Flags octet 1710 is set to 0, the third octet of the Path Attribute contains the length of the attribute data in octets. If the Extended Length bit of the Attribute Flags octet is set to 1, then the third and the fourth octets of the path attribute contain the length of the attribute data in octets. Attribute length code 1724 depicts both of these cases. The remaining octets of the Path Attribute represent the attribute value 1726 and are interpreted according to the Attribute Flags 1710 and the Attribute Type Code 1712.

Among the more important Attribute Type Codes are the ORIGIN (Type Code 1), the AS_PATH (Type Code 2), and the NEXT_HOP (Type Code 3). The ORIGIN is a well-known mandatory attribute that defines the origin of the path information. The AS_PATH is a well-known mandatory attribute that is composed of a sequence of AS path segments. Each AS path segment is represented by a triple. The path segment type is a 1-octet long field, while the path segment length is a 1-octet long field containing the number of ASs in the path segment value field. The path segment value field contains one or more AS numbers, each encoded as a 2-octets long field. The NEXT_HOP is a well-known mandatory attribute (RFC 1771) that defines the IP address of the router that should be used as the BGP next hop to the destinations listed in the Network Layer Reachability field of the UPDATE message. The router makes a recursive lookup to find the BGP next hop in the routing table.

Figure 17B:
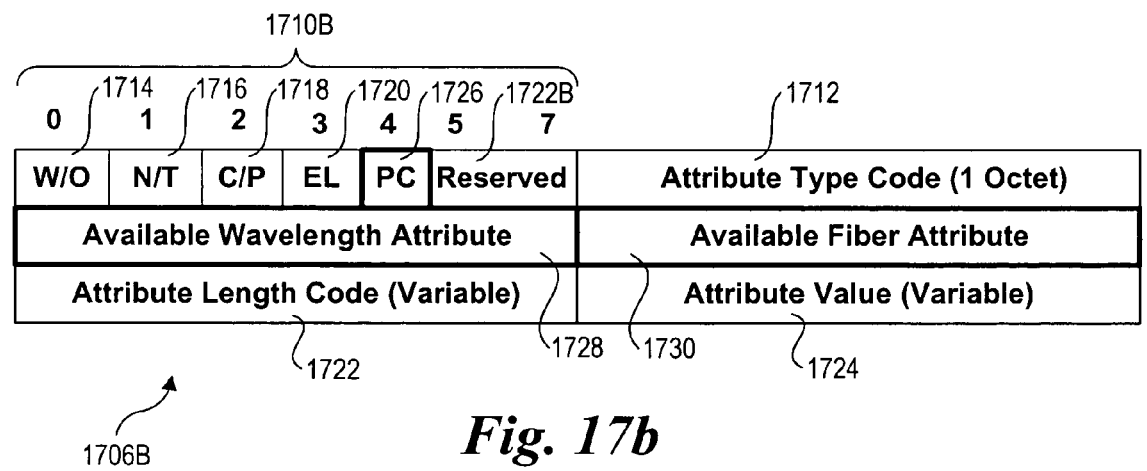
FIG. 17b is a diagram illustrating the additional fields that are added to the path attributes for the BGP UPDATE message of FIG. 17a that enable external routing to be extended to optical burst-switched networks, according to one embodiment of the invention.

In accordance with aspects of extending BGP routing to optical-switched networks, FIG. 17b shows details of a set of modified Path Attributes 1706B containing additional information (shown in the boxes with the bolded lines) for specifying optical transmission attributes to extend the BGP protocol to optical-switched networks, according to one embodiment. These extensions include a PBS connection (PC) field 1726, an Available Wavelength Attribute field 1728, and an Available Fiber Attribute field 1730. PC field 1726 corresponds to bit 4 of an Attribute Flags octet 1710B. A value of 0 indicates that a PBS connection is unavailable. A value of 1 indicates a PBS connection is available.

The value in the Available Wavelength Attribute field 1728 indicates the status of the current wavelength availability between neighboring PBS networks (optical domains). If the value is 0, no wavelengths are available for the requested lightpath. Any included value corresponds to one or more wavelengths that are available for the requested lightpath. This means that the BGP router that is co-located with a PBS LER can start a lightpath set-up process to a specific destination.

The value in Available Fiber Attribute field 1730 indicates the status of the current fiber availability between neighboring PBS networks. A value of 0 indicates the fiber is not available for the requested lightpath. This means that either the fiber is used by other wavelengths or the fiber link is down. In either case, a backup route must be selected. A non-zero value indicates the fiber is available for use by the requested lightpath to the destination address.

Returning to FIG. 17, Network Layer Reachability Information field 1708 comprises a variable length field containing a list of IP address prefixes. The length in octets of the Network Layer Reachability Information is not encoded explicitly, but can be calculated as:

Reachability information is encoded as one or more 2-tuples of the form, Length (1 octet), Prefix (variable length). The Length field indicates the length in bits of the IP address prefix. A length of zero indicates a prefix that matches all IP addresses (with prefix, itself, of zero octets). The Prefix field contains IP address prefixes followed by enough trailing bits to make the end of the field fall on an octet boundary, wherein the value of the trailing bits is irrelevant.

UPDATE messages in BGP are the most relevant to the design and operation of the PBS BGP since they convey the new route availability information from router to router. For example, the network topology (from a BPG router standpoint) can be expressed through advertisements that are made to neighboring BPG routers via corresponding UPDATE messages. These principles are well-known to those skilled in the network routing arts.

Figure 18:
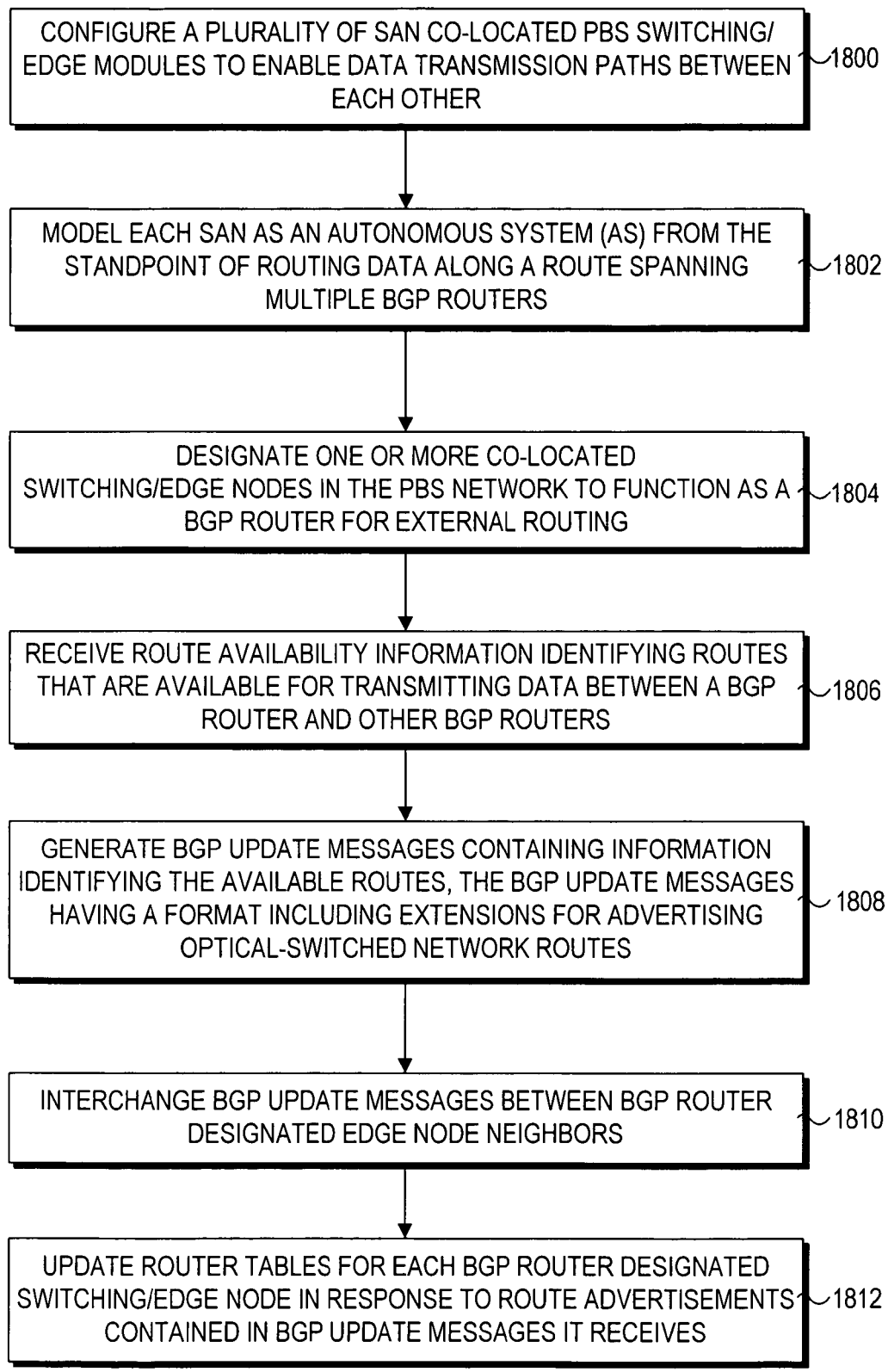
FIG. 18 is a flowchart illustrating the operations used to configure and initialize a PBS network to enable PBS-based transmission of data between multiple SANs coupled to the PBS network.

A flowchart summarizing the foregoing setup and network update operations is shown in FIG. 18. The setup process begins in a block 1800, wherein plurality of PBS switching/edge node modules, co-located at respective SAN gateways, are configured to enable data transmission paths between each other, thus enabling PBS-based data transmission between SANs over PBS networking infrastructure. In general, the communication links may comprise one or more optical fiber links between respective optical I/O modules 1302.

Next, in a block 1802, each SAN is modeled as an autonomous system (AS) from the standpoint of routing data along routes spanning multiple BGP routers. Selected co-located PBS switching/edge modules are then designated to function as BGP routers for external routing between SANs, as depicted in a block 1804.

In a block 1806, each BGP router designated module receives route availability information for other nodes within the PBS network identifying routes that are available for transmitting data between that node and other BGP routers in the network. What this does is provide routing information identifying the available routes between ingress and egress BGP routers within a given PBS network. Corresponding BGP UPDATE messages containing advertisements for the routes are then generated in a block 1808, wherein the BGP UPDATE messages have the path attributes format shown in FIG. 17b.

At this point, the BGP update messages including the optical-switched network routing support extensions are interchanged between BGP router neighbors to update the external routing table in each BGP router. These operations are performed in blocks 1810 and 1812. Each external routing table contains multiple routing records, each specifying a route to a destination network. Specifically, each routing record includes a list of segment hops (i.e., BGP router addresses) that would be sequentially encountered to reach an ingress node BGP router at SAN that hosts a destination address. The external routing data do not include any details of the internal routing used within an AS.

Once the enterprise network is configured and initialized (i.e., BGP routing tables are built), data may be transmitted among different PBS networks and among different PBS networks and non-PBS networks using the extended BGP routing for external routing operations and using the IGP routing mechanism for internal routes within a given PBS network. Thus, the routing is analogous to that employed by the Internet, except for now the routers consider optical-switched network availability information when updating their routing tables in addition to conventional external routing advertisements.

When functioning as an intermediate node along a given route, a PBS switching/edge node module will provide PBS switch functionality similar to PBS switching modules 217 discussed above. At the same time, a PBS switching/edge node module at a source SAN will function as a BGP router and a PBS egress node, with the PBS switching/edge node module at the destination SAN will function as a PBS ingress node.

Returning to FIG. 9a, in one embodiment, the foregoing BGP router functionality may be implemented in one or more PBS edge nodes 910, as depicted by a BGP router module 916. In this embodiment, a PBS edge node 910 will provide EGP routing functionality, as well as providing the PBS edge node and co-located SAN gateway operations.

In general, the BGP router functionality may be provided by a separate server module, or may be integrated onto an existing component of unit 1300, such as integrated into an optical PBS I/O module 1302. As with the foregoing PBS switching node and edge node functionality, the router functionality can be implemented via hardware (e.g., programmed logic), software, or a combination of the two. More specifically, software for implementing PBS switching node, edge node, SAN gateway, and/or BGP router functionality may be embodied as one or more sets of instructions or modules including instructions that are executed on some form of processor core, such as a network processor, processor of a server or I/O module, or other type of processor.

Thus, embodiments of this invention may be used as or to support software program executed upon some form of processing core or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc.

In the foregoing specification, embodiments of the invention have been described. It will, however, be evident that various modifications and changes may be made thereto without departing from the broader spirit and scope as set forth in the appended claims. The specification and drawings are, accordingly, to be regarded in an illustrative rather than a restrictive sense.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for transferring data between a plurality of SANs (Storage Area Networks and/or Server Area Networks), comprising:
    coupling a first SAN to a second SAN via an optical burst-switched (OBS) network infrastructure;
    receiving data from the first SAN, said data configured according to a first SAN format;
    encapsulating the data into one or more OBS data bursts;
    transmitting the one or more OBS data bursts across the OBS network from the first SAN to the second SAN; and
    extracting the encapsulated data at the second SAN,
    wherein the OBS network comprises a photonic burst-switched (PBS) network,
    wherein coupling the first SAN to the second SAN via the (OBS) network infrastructure comprises co-locating a respective PBS edge node module at a respective SAN gateway for each of the first and second SANs such that collectively each SAN gateway and PBS edge node module provides an interface between a SAN and one or more interior PBS switching nodes of the PBS networking infrastructure.

2. The method of claim 1, wherein the OBS network comprises a wavelength-division multiplexed (WDM) PBS network.

3. The method of claim 1, wherein the first SAN format for the data comprises Fibre Channel (FC) frames, and encapsulating the data into one or more OBS data bursts comprises encapsulating at least one FC frame in each of said one or more OBS data bursts.

4. The method of claim 1, wherein the respective operations performed by a SAN gateway and PBS edge node are provided by at least one module contained in a multi-module unit.

5. The method of claim 4, wherein said at least one module comprises a plurality of server blades coupled via a common backplane in a modular reconfigurable communication platform.

6. The method of claim 1, further comprising:
    co-locating at least one External Gateway Protocol router module at a respective SAN Gateway for at least one of the first and second SANs; and
    determining, using an External Gateway Protocol router, a route via which the one or more OBS data bursts are transmitted between the first and second SANs.

7. The method of claim 1, wherein coupling the first SAN to the second SAN via the (OBS) network infrastructure comprises:
    optically coupling the respective PBS switching/edge nodes modules to one another.

8. The method of claim 4, wherein said at least one module comprises a plurality of server blades coupled via a common backplane in a server blade unit.

9. The method of claim 7, further comprising:
    optically coupling a third and fourth SAN to the first and second SANs, each of the third and fourth SANs being optically coupled at a co-located SAN gateway and PBS switching/edge node; and
    determining a route to optically transmit the one or more optical bursts, said route comprising a concatenation of at least two route segments, each route segment coupled between respective pairs of SANs.

10. The method of claim 9, further comprising configuring at least one of the co-located PBS switching/edge nodes as an External Gateway Protocol router; and
    determining the route using an External Gateway Protocol router.

11. The method of claim 10, wherein the External Gateway Protocol comprises an extension to the Border Gateway Protocol that includes provisions for PBS networks, and determining the route includes determining an optical wavelength to be used for each route segment.

12. A machine-readable storage medium to provide instructions, which when executed by a processor in an optical input/output (I/O) module cause the module to perform operations including:
    receiving a plurality of Fibre Channel Frames from a first SAN (storage area network or server area network) gateway;
        encapsulating the plurality of Fibre Channel Frames into one or more optical burst-switched (OBS) network data bursts at an OBS edge node; and
    transmitting the one or more OBS network data bursts to an OBS switching node for transmission to a second SAN gateway,
    wherein the OBS network comprises a photonic burst switched (PBS) network, and
    wherein the first SAN gateway and the OBS edge node are co-located within a single network unit to collectively provide an interface between a SAN including the first SAN gateway and the PBS network including the OBS edge node.

13. The machine-readable medium of claim 12, to provide further instructions that cause the optical I/O module to performs operations including:
    receive an OBS data burst frame via the OBS network;
    deframe the OBS data burst frame to extract one or more encapsulated FC frames; and
    provide the FC frames to the first SAN gateway.

14. The machine-readable medium of claim 12, to provide further instructions that cause the optical I/O module to performs operations including:
    extract routing data from an FC frame identifying a destination address to which the data is to be routed;
    select a route that may be used to reach the destination address from among routes stored in a routing table; and
    forward a data burst in which the FC frame is encapsulated to a next hop in the route that is selected.

15. The machine-readable medium of claim 14, wherein optical I/O module comprises an ingress node at which the data is received, and the data is to be forwarded to an egress node of the OBS network, the machine-readable medium to provide further instructions to cause the optical I/O module to performs operations including:
    reserving a lightpath spanning between the ingress node and the egress node; and
    sending the data burst over the lightpath that is reserved.

* * * * *

UNITED STATES PATENT AND TRADEMARK OFFICE
CERTIFICATE OF CORRECTION

PATENT NO. : 7,634,582 B2  
APPLICATION NO. : 10/742562  
DATED : December 15, 2009  
INVENTOR(S) : Shlomo Ovadia Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1760 days.

Signed and Sealed this

Ninth Day of November, 2010

David J. Kappos  
*Director of the United States Patent and Trademark Office*